United States Patent
Rivlin

(10) Patent No.: US 7,832,651 B2
(45) Date of Patent: Nov. 16, 2010

(54) HYDRAULICALLY CONTROLLED THERMOSTATIC MIXING VALVE

(76) Inventor: Eitan Rivlin, 21 Be'erot St., 90917 Givat Ze'ev (IL)

( * ) Notice: Subject to any disclaimer, the term of this patent is extended or adjusted under 35 U.S.C. 154(b) by 987 days.

(21) Appl. No.: 10/527,791

(22) PCT Filed: Sep. 18, 2003

(86) PCT No.: PCT/IL03/00755

§ 371 (c)(1), (2), (4) Date: Oct. 5, 2006

(87) PCT Pub. No.: WO2004/027295

PCT Pub. Date: Apr. 1, 2004

(65) Prior Publication Data

US 2007/0063060 A1 Mar. 22, 2007

(30) Foreign Application Priority Data

Sep. 19, 2002 (IL) .................................. 151809

(51) Int. Cl.
*G05D 23/12* (2006.01)
*G05D 23/13* (2006.01)
*G05D 23/02* (2006.01)

(52) U.S. Cl. ............. 236/12.13; 236/12.15; 236/101 E

(58) Field of Classification Search ............. 236/12.11, 236/93 A, 99 R, 99 K, 99 J, 101 R, 101 E, 236/103, 12 R, 12.12, 12.13, 12.15; 137/100, 137/101, 597, 607, 99, 495

See application file for complete search history.

(56) References Cited

U.S. PATENT DOCUMENTS

| | | | |
|---|---|---|---|
| 1,869,663 A | 8/1932 | Cartier | |
| 2,308,127 A | 1/1943 | Symmons | |
| 2,383,215 A | 7/1943 | Reynolds | |
| 2,381,146 A | 8/1945 | Von Wongenheim | |
| 2,383,878 A | 8/1945 | Miller | |
| 2,449,766 A * | 9/1948 | Brown | 236/12.11 |
| 2,534,378 A | 12/1950 | Schlaich | |
| 2,542,273 A | 2/1951 | Brown | |
| 2,550,907 A | 5/1951 | Brown | |
| 3,091,393 A | 5/1963 | Sparrow | |
| 3,539,099 A | 11/1970 | Grohe | |
| 3,561,481 A | 2/1971 | Taplin | |
| 3,561,483 A * | 2/1971 | Taplin | 137/625.4 |
| 3,581,759 A * | 6/1971 | Veale | 137/101.19 |
| 3,642,199 A | 2/1972 | Halkema | |
| 3,901,261 A * | 8/1975 | Riis | 137/100 |
| 3,980,229 A * | 9/1976 | Stedman et al. | 236/12.11 |
| 4,166,575 A * | 9/1979 | Sassi | 236/12.21 |

(Continued)

*Primary Examiner*—Frantz F Jules
*Assistant Examiner*—Alexis K Cox
(74) *Attorney, Agent, or Firm*—Law Offices of Edward Langer

(57) ABSTRACT

A fluid mixing valve for producing a mixed fluid stream from first and second inlet fluid streams having different, varying temperatures, and having different, varying pressures, the mixed fluid stream having a substantially stable, preselected temperature of a magnitude between the temperatures of the first and second inlet fluid streams, the fluid mixing valve including a housing and a mixing regulation assembly disposed within the housing. The invention also provides a method for producing a mixed fluid stream from first and second inlet fluid streams having different, varying temperatures, and having different, varying pressures, the mixed fluid stream having a substantially stable, preselected temperature of a magnitude between the temperatures of the first and second fluid streams.

24 Claims, 13 Drawing Sheets

U.S. PATENT DOCUMENTS

| | | | |
|---|---|---|---|
| 4,349,149 A * | 9/1982 | Humpert | 236/12.1 |
| 4,458,839 A | 7/1984 | MacDonald | |
| 4,909,435 A * | 3/1990 | Kidouchi et al. | 236/12.12 |
| 5,033,671 A * | 7/1991 | Shiba et al. | 236/12.12 |
| 5,161,737 A | 11/1992 | Olmsted et al. | |
| 5,339,859 A | 8/1994 | Bowman | |
| 5,427,312 A * | 6/1995 | Simonov et al. | 236/12.11 |
| 5,503,183 A * | 4/1996 | Fenn et al. | 137/597 |
| 6,050,285 A | 4/2000 | Goncze | |
| 6,059,193 A | 5/2000 | Braathen | |
| 6,234,670 B1 * | 5/2001 | Bergeron | 374/138 |
| 6,405,932 B1 * | 6/2002 | Palmer | 236/12.1 |
| 6,679,476 B2 * | 1/2004 | Noyes et al. | 251/263 |
| 6,708,895 B1 * | 3/2004 | Knapp | 236/12.1 |
| 6,811,713 B2 * | 11/2004 | Arnaud | 210/788 |
| 6,820,816 B1 * | 11/2004 | Reid | 236/12.13 |

\* cited by examiner

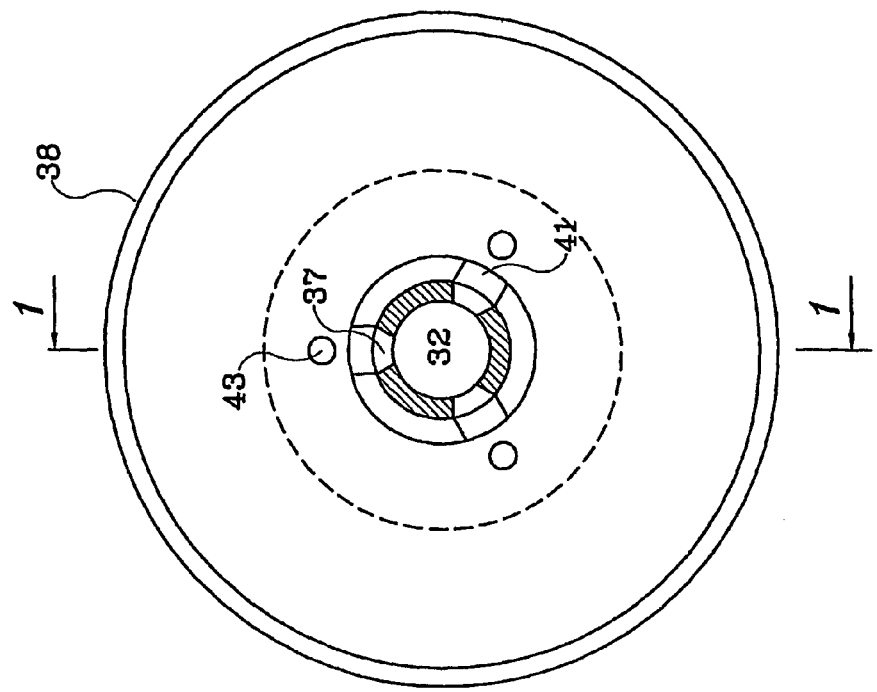
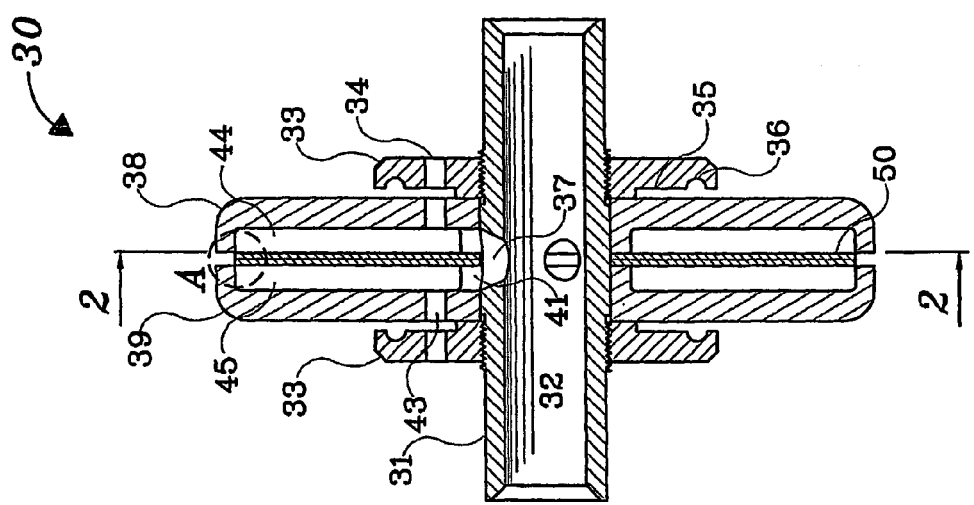
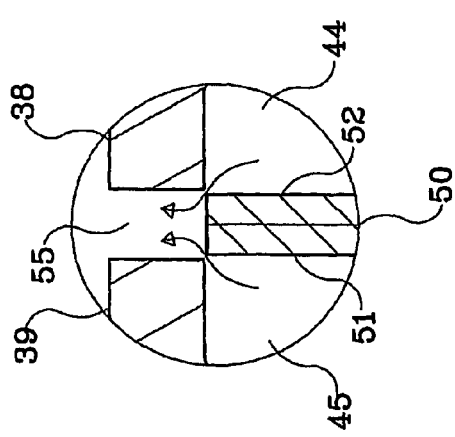

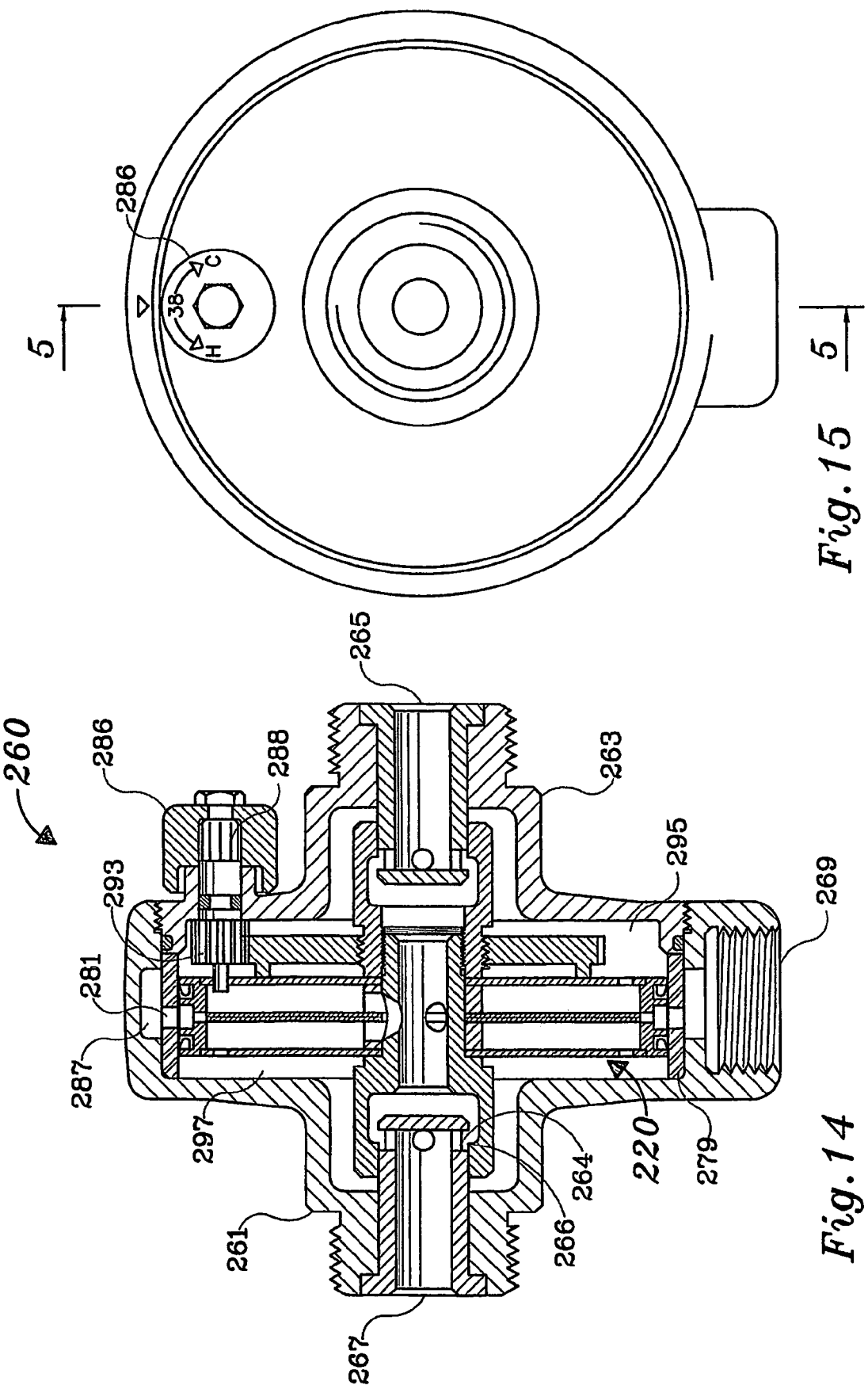

HYDRAULICALLY CONTROLLED THERMOSTATIC MIXING VALVE

FIELD OF THE INVENTION

The present invention relates to thermostatic mixing valves and, more specifically, to hydraulic control of thermostatic mixing valves.

BACKGROUND OF THE INVENTION

It is known in the art to provide a thermostatic mixing valve to control the temperature of warm water by controlling the proportions of supplied hot and cold water.

From the time that piped hot and cold running water became a common feature of architecture there has been an awareness of the occasional inconvenience resulting from a sudden change in temperature or pressure to the hot or cold water supplied to a common outlet such as a shower. In extreme cases, the resulting change in temperature of the water from an outlet can result in substantial discomfort or injury to the user, most especially in a shower cubicle. A sudden pressure drop in the cold water supply, such as occurs when an adjacent toilet is flushed, will result in a sudden increase in the temperature of the shower water and a potentially dangerous situation.

Self-regulating mixing valves for mixing hot and cold water can be defined according to the following six categories:

The first type of self-regulating valve utilizes a pressure-balancing mechanism to prevent the sudden temperature changes that arise from pressure changes in one of the supply lines. This type of valve, however, will not respond to a decrease in the temperature of water in the hot water supply line. It will therefore not compensate for a gradual temperature change that occurs as the hot water tank cools off due to peak household demand or as the household demand is subsequently reduced. This type of mixing valve is typified by the valves disclosed in U.S. Pat. No. 2,308,127 to Symmons on Jan. 12, 1943 entitled "Non-scald Mixing Valve" and U.S. Pat. No. 6,050,285 to Goncze, et al. on Apr. 18, 2000, entitled "Pressure Balancing Valve."

Similarly, as disclosed in U.S. Pat. No. 5,161,737, pressure-reducing valves equalize pressures in both inlets to the mixing valve, which then stabilizes the temperature. The design of such pressure equalizing valves is complex and these are still affected by any temperature changes of the incoming fluids. Consequently, these pressure equalizing valves cannot maintain a stable temperature.

Another type of self-regulating valve provides a shut-off mechanism to automatically stop or divert the water flow discharged from the valve when the temperature of the outlet water exceeds some preselected maximum temperature. An example of this type of valve is disclosed in U.S. Pat. No. 2,534,378 to Schlaich on Dec. 19, 1950 entitled "Safety Control For Shower Heads And Other Hot Water Outlets."

A third type of self-regulating valve is a directly driven thermostatically controlled valve. These valves typically comprise a housing having a mixing chamber, hot and cold water inlets and a proportioning valve disposed between the inlets and the mixing chamber. A temperature responsive element, disposed within the mixing chamber, is coupled directly to the proportioning valve at one end and to the housing at the other end. Examples of this type of valve are disclosed in U.S. Pat. No. 2,272,403 to Fields on Jun. 10, 1939, entitled "Mixing Valve," U.S. Pat. No. 2,383,215 to Reynolds on Jul. 26, 1943, entitled "Mixing Valve," U.S. Pat. No. 2,463,640 to Plett on Mar. 8, 1949, entitled "Thermostatic Water Control" and U.S. Pat. No. 3,539,099 to Grohe on Nov. 10, 1970, entitled "Thermostat Controlled Mixing Faucet."

In a thermostatic mixing valve, which is another version of the above mentioned directly-driven thermostatically-controlled valve, such as those disclosed in U.S. Pat. No. 5,108,032 to Stewart on Apr. 28, 1992 entitled "Fluid Mixture Control Valve," U.S. Pat. No. 5,110,044 to Bergmann on May 5, 1992 entitled "Sanitary Mixing Valve" and U.S. Pat. No. 5,203,496 to Kline on Apr. 20, 1993 entitled "Thermostatic Control Valve with Fluid Mixing," the relative hot and cold fluid flow rates are controlled by a proportioning valve set directly in accordance with a thermally responsive element.

However, such directly driven thermostatically controlled valves fail to provide a constant outlet water temperature but, instead, greatly reduce the deviation of the outlet water temperature from a preselected temperature consequent to temperature or pressure changes in the supply lines. The user selects a temperature by adjusting the proportioning valve position to give a preselected temperature. If the water supply temperature and pressure remain constant, the proportioning valve remains stationary and the outlet water remains at the preselected temperature. The dynamic system consisting of the temperature responsive mechanism, connected directly to the proportioning valve at one end and to the housing at the other end, remains in static equilibrium.

If, however, the pressure or the temperature of the water in one of the supply lines assumes a new value, the temperature of the outlet water is temporarily changed. The temperature responsive mechanism responds to the temperature change by directly moving the proportioning valve in the direction that will tend to restore the mixed water temperature to its previous level. As the proportioning valve responds the outlet water temperature changes and eventually causes the temperature responsive mechanism to reverse the direction of its movement, giving rise to a period of oscillations. Thereafter the dynamic system will seek a new equilibrium position corresponding to a new equilibrium outlet water temperature. This new equilibrium water temperature is not identical to the preselected temperature since the position of the temperature responsive mechanism corresponding to the preselected temperature is the initial mechanism position.

The fourth type of self-regulating valve disclosed is the feedback servomechanism valve. This valve uses a valve element not directly linked to the housing by the temperature responsive element. When the temperature responsive element senses a temperature deviation from a preselected value, a signal is transmitted to a valve element causing movement in a direction to restore the outlet temperature. When the preselected outlet temperature is reached as sensed by the temperature responsive element, signal transmission ceases. Examples of this type of valve are disclosed in U.S. Pat. No. 1,869,663 to Cartier on Aug. 2, 1932, entitled "Thermostatic Mixing Means," U.S. Pat. No. 2,449,766 to Brown on Sep. 21, 1948, entitled "Means for Producing Uniform Fluid Mixtures," U.S. Pat. No. 2,542,273 to Brown on Feb. 20, 1951, entitled "Temperature Controlled Mixing Valve," U.S. Pat. No. 2,550,907 to Brown on May 1, 1951, entitled "Temperature Controlled Mixing Valve," U.S. Pat. No. 3,561,481 to Taplin on Feb. 9, 1971, entitled "Fail-Safe Servo-Controlled Mixing Valve," U.S. Pat. No. 3,642,199 to Halkema on Feb. 15, 1972, entitled "Thermostatic Mixer for Hot and Cold Liquids" and U.S. Pat. No. 4,458,839 to MacDonald on Jul. 10, 1984, entitled "Thermostatic Valve Assembly." All the above-mentioned inventions include the use of a small portion of the flow to regulate valve element movement in accordance with temperature change.

The servomechanism valves represent an improvement, in theory, over directly operated valves because the temperature responsive element is restored to the same equilibrium position when the preselected temperature is reached, regardless of the temperature or the pressure of the supply water. Since no oscillation fading period is required to reach an equilibrium position, as with the directly operated thermostatically controlled valve, servomechanism valves respond more quickly to adjust the outlet water temperature. Consequently, servomechanism thermostatic valves more accurately maintain the preselected temperature.

It should be noted that most servomechanism valves do not respond in the theoretical fashion described above given a hot and cold inlet water extreme pressure imbalance because the imbalance alters the equilibrium position of the valve member.

Furthermore, the disclosed servomechanism valves are extremely large compared to conventional valves. Also, common to servomechanism valves and two stage valve assemblies, the long narrow fluid passageways are easily clogged by suspended particles in the water supply.

The fifth type of valve is a two-stage valve assembly. A first stage, comprising pressure equalization means, compensates for pressure changes, maintaining a constant hot and cold-water pressure ratio. Downstream, a second stage is a thermostatically controlled proportioning valve. An example of this type of valve is disclosed in U.S. Pat. No. 3,539,099 to Grohe on Nov. 10, 1970, entitled "Thermostat Controlled Mixing Faucet" Utilizing this type of valve, the outlet water temperature remains constant over a wide range of supply pressures and temperatures. The major disadvantage of this valve is a substantial increase in the number of components, the cost of assembly, and the space required for the valve assembly compared to one-stage valves.

A sixth approach to temperature control is to employ the use of a degenerative feedback device, usually comprising hot and cold water inlets, a mixing chamber, a stepper or other motor controlled valve, a temperature sensor, an electric comparator unit for comparing the temperature sensor signal with a reference signal, and a motor controller for keeping the signal differences as low as possible. Such systems often include sophisticated electronics, a microprocessor and an electrical power supply. Safety protection against electrical shock is needed, as well as protection against power loss to avoid the risk of losing control of the mixed water temperature. These devices are expensive and not applicable, for example, to a domestic shower.

Referring now to U.S. Pat. No. 5,427,312 to Simonov, et al. on Jun. 27, 1995, entitled "Thermostatic Mixing Valve and Method of Use Thereof," therein is disclosed a thermostatic mixing valve and method of use thereof. The thermostatic mixing valve, having incoming hot and cold water mixed in a mixing chamber, is controlled by a thermally responsive element disposed in the fluid outlet from the mixing chamber. A distributor for distributing the operative flow is controlled by the thermally responsive element. Activated by pressure of the fluid, a drive is connected to the distributor for controlling the position of the drive. The distributor is used to control the hot and cold fluid flows. Channels are provided to connect the distributor with one of the fluid inlets, to connect the distributor with the outside of the valve body, to conduct away used operating fluid and to connect the distributor with the drive.

If the pressure or temperature of the supply of either hot or cold fluid to the mixing valve disclosed in U.S. Pat. No. 5,427,312 changes to a new value, the temperature of the outlet stream will temporarily change until the proportioning valve restores the outlet temperature. There is a significant drawback to this mixing valve. Only a small proportion of the flow of one of the incoming fluids is utilized as an operative flow, which must then be separately discharged from the valve body. This operative flow is carried in a small-bore conduit, as a result of which there is a substantial risk of blockage of the small-bore conduit.

Thus there is a need to provide a mixing valve which is inexpensive, compact and provides a stable out-flow temperature in spite of variations in temperature or pressure of the hot and cold supply liquids. There is also a need for such a valve to protect against flow stoppage of either the hot or cold supply, so as to avoid exposing a user to the risk, most especially from the supply of the hot liquid stream alone. In addition, the mixing valve must not be subject to failure or malfunction as a result of accumulation of solid particles from the supply streams or of a power failure.

SUMMARY OF THE INVENTION

The present invention aims to provide a hydraulic control mechanism in a simple and compact mixing valve. The absence of a mechanical link, via the sensing element, between a proportioning valve and a housing, results in a stable liquid outflow temperature despite variations in temperature or pressure of the hot and cold liquid supply. Making use of substantially the full operating flow to activate the valve mechanism, results in a valve mechanism that is not subject to failure consequent to the accumulation of solid material or solid particles and subsequent blockage of any narrow flow channels. The present invention also seeks to provide a mixing valve which protects the user from total flow failure, most especially of the cold supply. Furthermore, the present invention requires no electrical power supply with attendant risks to the user.

According to a preferred embodiment of the present invention, there is provided a fluid mixing valve for producing a mixed fluid stream from first and second fluid streams having different, varying temperatures, and having different, varying pressures, the mixed fluid stream having a substantially stable, preselected temperature of a magnitude between the temperatures of the first and second fluid streams. The fluid mixing valve includes a housing, which includes a first fluid inlet for admitting the first fluid stream, a second fluid inlet for admitting the second fluid stream, and a first fluid outlet for the resulting mixed fluid stream. The fluid mixing valve also includes a mixing regulation assembly disposed within the housing, which comprises a mixing element having spaced apart third and fourth fluid inlets, and a second fluid outlet arranged in fluid flow communication with the third and fourth fluid inlets, the third and fourth fluid inlets being arranged so as to permit the flow therethrough of the first and second fluid streams so as to facilitate mixing thereof into a mixed fluid stream, the second fluid outlet being arranged so as to facilitate outflow therethrough of the mixed fluid stream.

The mixing regulation assembly further comprises a stream divider, arranged in fluid flow communication with the second fluid outlet, operative to divide the mixed fluid stream into two component streams, each having rates of flow and pressures which are substantially equal to those of the other. Additionally, the mixing regulation assembly also comprises at least one flow controlling mechanism for increasing the flow of one of the component streams and decreasing the flow of the other component stream in concert, so as to induce a pressure differential between the two component streams; at least one thermally responsive element arranged to be in fluid flow and in heat transfer communication with at least one of the component streams and operative to control the at least one flow controlling mechanism in response to a difference between the temperature of the component streams and the preselected temperature; and also a recombination and discharge means for recombining the component streams into a mixed fluid stream for output from the fluid mixing valve via the first fluid outlet.

The mixing regulation assembly is operative in response to a difference between the temperature of the component streams and the preselected temperature resulting from a change in temperature or pressure of at least one of the first and second fluid streams. In response to the induced pressure differential between the two component fluid streams, it adjusts the relative flows of the first and second fluid streams, so as to counterbalance the difference between the temperature of the two component streams and the preselected temperature, thereby substantially restoring the mixed fluid stream to the preselected temperature.

According to an embodiment of the present invention, the fluid mixing valve has first and second fluid inlets, which respectively include mechanically linked first and second inlet valves so as to control the relative inlet flows of the first and second fluid streams.

According to another embodiment of the present invention, the first and second inlet valves substantially increase the flow through one of the inlets while simultaneously decreasing the flow through the other inlet in response to the mixing element.

According to a further embodiment of the present invention, the first fluid outlet includes an outlet flow regulator valve for controlling the rate of flow through the fluid mixing valve.

According to an additional embodiment of the present invention, the housing includes at least one housing element and at least one closure element for facilitating disposition of the mixing regulation assembly therein.

According to an embodiment of the present invention, the housing further includes a temperature adjusting mechanism for altering the preselected temperature of the mixed fluid stream, the temperature adjusting mechanism including at least one pressure differential inducing mechanism for changing the relative rates of flow of the two component fluid streams therebetween, wherein the at least one pressure differential inducing mechanism is selected from the group of:

a double-acting valve;

a displacement mechanism; and a position-changing mechanism for changing the position of the thermally responsive element.

According to an added variation of an embodiment of the present invention, the temperature adjusting mechanism is configured to provide an equilibrium configuration of the mixing regulation assembly associated with the altered preselected temperature.

According to a further embodiment of the present invention, the mixing regulation assembly is configured within the housing as a working element operative in response to the pressure differential between the two component fluid streams and provided with a separator to substantially prevent fluid leakage between the two component streams past the working element, and wherein the separator is selected from one of the group of:

a diaphragm having at least one flexible membrane;

a piston having at least one circumferential fluid seal; and a vane rotationally operative having a peripheral seal.

According to an additional embodiment of the present invention, mixing regulation assembly operative to adjust the relative flows of said first and second fluid streams is selected from the group of:

a rotationally operative planar disc;

a rotationally operative ball;

a displaceably operative planar slide; and a displaceably operative spool pipe assembly.

According to an embodiment of the invention, the displaceably operative mixing regulation assembly further comprises at least one space-saving element.

According to yet another embodiment of the invention, the stream divider is selected from the group of:

fixed orifices;

adjustable aperture; and vane wheels disposed on a common axis.

In another embodiment of the present invention, a relative portion of the mixed fluid is discharged through a spring-loaded bypass before entering the flow divider thereby allowing high flow rates of the mixed fluid through the mixing valve.

Additionally, in another embodiment of the present invention, the at least one thermally responsive element is selected from the group of: bimetal elements; thermally expandable elements, wax-operated thermostats, and fluid-operable elements.

According to a variation of an embodiment of the present invention, the bimetal element is configured as one of the elements selected from the group of: disc, coil and rod.

According to another embodiment of the present invention, the one or more flow controlling mechanisms include a double-acting valve device for altering the preselected temperature of the mixed fluid stream.

According to an added embodiment of the present invention, the recombination and discharge means includes a double-acting valve for changing the relative rates of flow of the two component fluid streams so as to induce a pressure differential between the two component fluid streams, thereby altering the preselected temperature.

Furthermore, there is provided a method for producing a mixed fluid stream from first and second inlet fluid streams having different, varying temperatures, and having different, varying pressures, the mixed fluid stream having a substantially stable, preselected temperature of a magnitude between the temperatures of the first and second inlet fluid streams.

The method includes the steps of:

combining first and second inlet fluid streams so as to produce a mixed fluid stream;

dividing the mixed fluid stream into two component streams having respective rates of flow and pressures which are substantially equal;

sensing a difference between the temperature of the component streams and a preselected temperature;

unbalancing the substantially equal rates of flow of the two component streams, such that the rate of flow of one of the two component streams is increased and the rate of flow of the other of the two component streams is decreased in accordance with the sensed difference between the temperature of the two component streams and the preselected temperature, thereby inducing a pressure differential between the two component streams;

adjusting the relative rates of flow of the first and second inlet fluid streams in relation to the induced pressure differential between, the two component streams, such that the flow of one of the first and second inlet fluid streams is increased and the flow of the other stream is decreased in relation to the pressure differential between the two component streams, thereby restoring the temperature of the two component streams substantially to the preselected fluid temperature; and recombining the two component streams to produce a combined outlet stream.

According to an added embodiment of the present invention, the method step of dividing the mixed fluid stream into two component streams utilizes a volumetric flow divider.

According to another embodiment of the present invention, after the method step of combining said first and second inlet fluid streams so as to produce said mixed fluid stream there is a step of direct discharge of a relative portion of the mixed fluid stream to the outlet stream.

According to an added embodiment of the present invention, the method step of sensing a difference between the temperature of the two component streams and the preselected temperature includes utilizing a thermally responsive device.

According to an embodiment of the present invention, the method further includes, before the step of sensing, a step of altering the preselected temperature.

According to an additional embodiment of the present invention, the method step of unbalancing the substantially equal rates of flow of the two component streams includes inducing a pressure differential between the two component streams thereby altering the preselected temperature of the mixed fluid stream.

According to another embodiment of the present invention, the method step of adjusting the relative rates of flow of the first and second inlet fluid streams includes substantially terminating the flow of one of the first and second inlet fluid streams if the flow of the other of the first and second inlet fluid streams is substantially terminated.

According to a further embodiment of the present invention, the method step of recombining the two component streams includes adjusting the relative rates of flow of the two component streams so as to induce a pressure differential between the two component streams thereby to change the preselected temperature of the mixed fluid stream.

In another embodiment of the invention, the steps of dividing the mixed fluid streams into two component streams and the step of unbalancing the substantially equal rates of flow of the two component streams are reversed.

BRIEF DESCRIPTION OF THE DRAWINGS

Attention is now directed to the attached drawings, not to scale, wherein like reference numerals or characters indicate corresponding or like elements. In the drawings:

FIG. 3 illustrates a cross-sectional view of a spool assembly in accordance with an embodiment of the present invention;

FIG. 4 illustrates a cross-sectional view of the spool assembly of FIG. 3 above;

FIG. 5 illustrates an enlarged view of indicated area "A" in FIG. 3 above;

FIG. 14 illustrates a cross-sectional view of a thermostatic mixing valve including the spool assembly of FIG. 11, disposed within a housing;

FIG. 15 illustrates an end view of the thermostatic valve of FIG. 14;

DETAILED DESCRIPTION OF THE INVENTION

The present invention seeks to provide a solution to the problem of providing a constant, stable temperature from separate supplies of hot and cold water or other fluids in various environments, including but not limited to industry, hospitals, sports clubs, hotels and homes, including end point uses such as basins and showers. While this is not an insuperable problem, a successful solution must provide a device, which is simple to install, requires no electrical power for reasons of safety, is compact, and protects the user from the danger of exposure to scalding hot water or the discomfort of cold water. Furthermore, the output temperature must remain stable at a pre-selected level in spite of fluctuations in both temperature and pressure of either of the supplies of hot and cold water consequent to load changes in the supply lines. The most problematic scenario to be avoided relates to a substantially total supply failure of cold water, potentially exposing the user to essentially undiluted hot water. In addition, there is a need for a selectively disengageable stop mechanism, which limits a maximum hot water setting. Most especially, the device must not be excessively costly or complex.

The general principal employed in regard to the preferred embodiment of the present invention relates to a mixing valve including a pressure operated feedback servomechanism, which utilizes substantially the full flow of fluid in the control channels. Incoming hot and cold water pass through a valve element, are first mixed, followed by division of the main mixed fluid stream of water into two substantially equal component streams flowing on either side of a large area piston, plunger, diaphragm or vane. Unbalancing of the flow rate between the two component streams at their inlet or outlet ports, by means of a temperature sensitive control element, temporarily alters the pressure balance on either side of the piston or diaphragm, causing it to change position. A mechanical connection between the hot and cold water valve element and the piston or diaphragm effectively closes the control loop (as disclosed hereinbelow in relation to FIGS. 3-19). Utilizing a bimetal disc as the temperature-sensing element in the form of a large area piston or diaphragm facilitates a simple and relatively low cost construction (as disclosed hereinbelow in relation to FIGS. 3-15).

Figure 1:
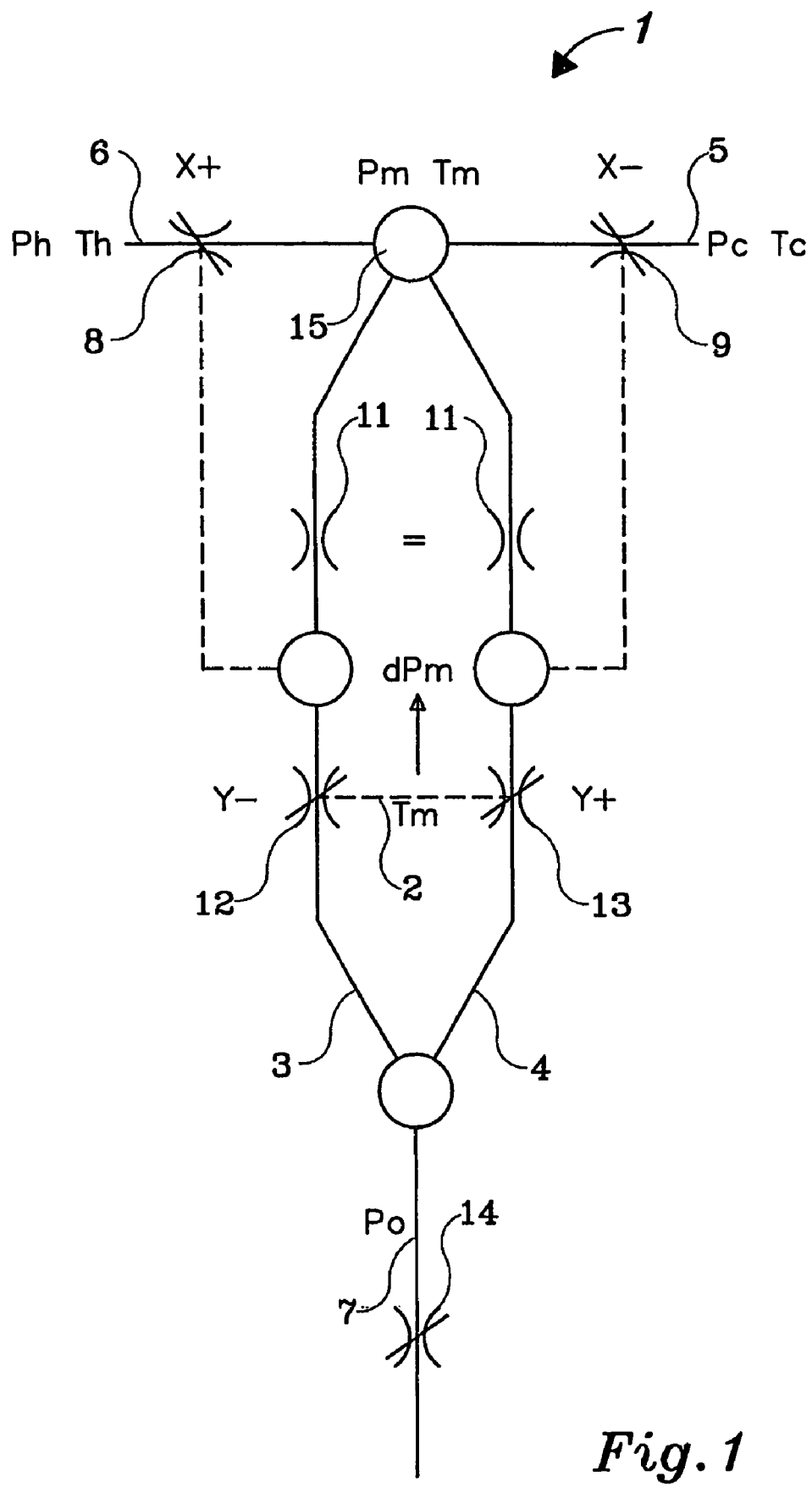
FIG. 1 illustrates an indicative flow diagram of a mixing valve, in accordance with an embodiment of the present invention, having a sensing element at exit ports of a divided flow.

With reference to FIG. 1, there is seen an indicative flow diagram which explains the operation of a sensing element 2, disposed at exit ports of flow paths 3 and 4 of a divided flow system 1. System 1 comprises a cold water inlet 5 with water entering at temperature Tc and pressure Pc, a hot water inlet 6 with water entering at temperature Th and pressure Ph, and a mixed water outlet 7 with water exiting at temperature Tm and pressure Po.

Hot and cold water pass through mechanically coupled, adjustable hot and cold water valves 8 and 9, respectively, which are enabled to make adjusting movements, the extent of which are represented by X+ and X−. The signs (+) and (−) represent a substantially identical adjusting movement of valves 8 and 9 but in opposite directions, that is for example, when hot water valve 8 opens, cold water valve 9 closes substantially to the same extent Adjustment of valves 8 and 9 is controlled in accordance with a pressure difference dPm as further related hereinbelow.

The incoming hot and cold water streams entering through valves 8 and 9 are mixed in a mixing chamber 15, in which the temperature is Tm and the pressure is Pm. Under normal operating conditions, Pm will be lower than the tower of Pc or Ph, and Tm will lie between Tc and Th. Furthermore, pressure Po is lower than Pm.

The main mixed water stream is divided into two substantially equal component streams by passing the mixed water stream through flow divider 11 such as two substantially similar fixed restrictors. Thereafter, the two component streams activate a temperature-sensing element 2, which reacts to changes in temperature Tm. The two component streams pass through a further pair of adjustable mechanically coupled divided stream valves 12 and 13 which, at their mid-position, permit flow substantially similar to that passing through flow divider 11, and which make adjusting movements, the extent of which are represented by Y+ and Y−. The signs (+) and (−) represent a substantially identical flow-adjusting movement of valves 12 and 13 but in opposite directions. The position of coupled valves 12 and 13 is adjusted by sensing element 2, thereby providing a pressure differential dPm between the two component streams. This pressure differential operationally activates hot and cold inlet valves 8 and 9. The requisite flow of mixed water is controlled by an outlet valve 14.

When the mixed water is at the preselected temperature, the two component streams having a temperature Tm (selected), divided component stream valves 12 and 13 are substantially equally open and there is no pressure difference dPm between the two component streams. If a pressure or temperature change occurs in either of the inlet streams, temperature Tm will be temporarily altered. As a result, the temperature-sensing element restricts water flow in one of the divided component streams and increases flow in the other, causing a pressure difference dPm, between the two component streams. Pressure difference dPm will accordingly reset inlet valves 8 and 9 to adjust the hot and cold flows in order to correct the change in temperature Tm. In order to preselect a different outlet temperature Tm, it is necessary to reset divided stream valves 12 and 13 to a new position, thereby influencing the pressure difference dPm and subsequently the relative flow rates of hot and cold water through inlet valves 8 and 9.

Figure 2:
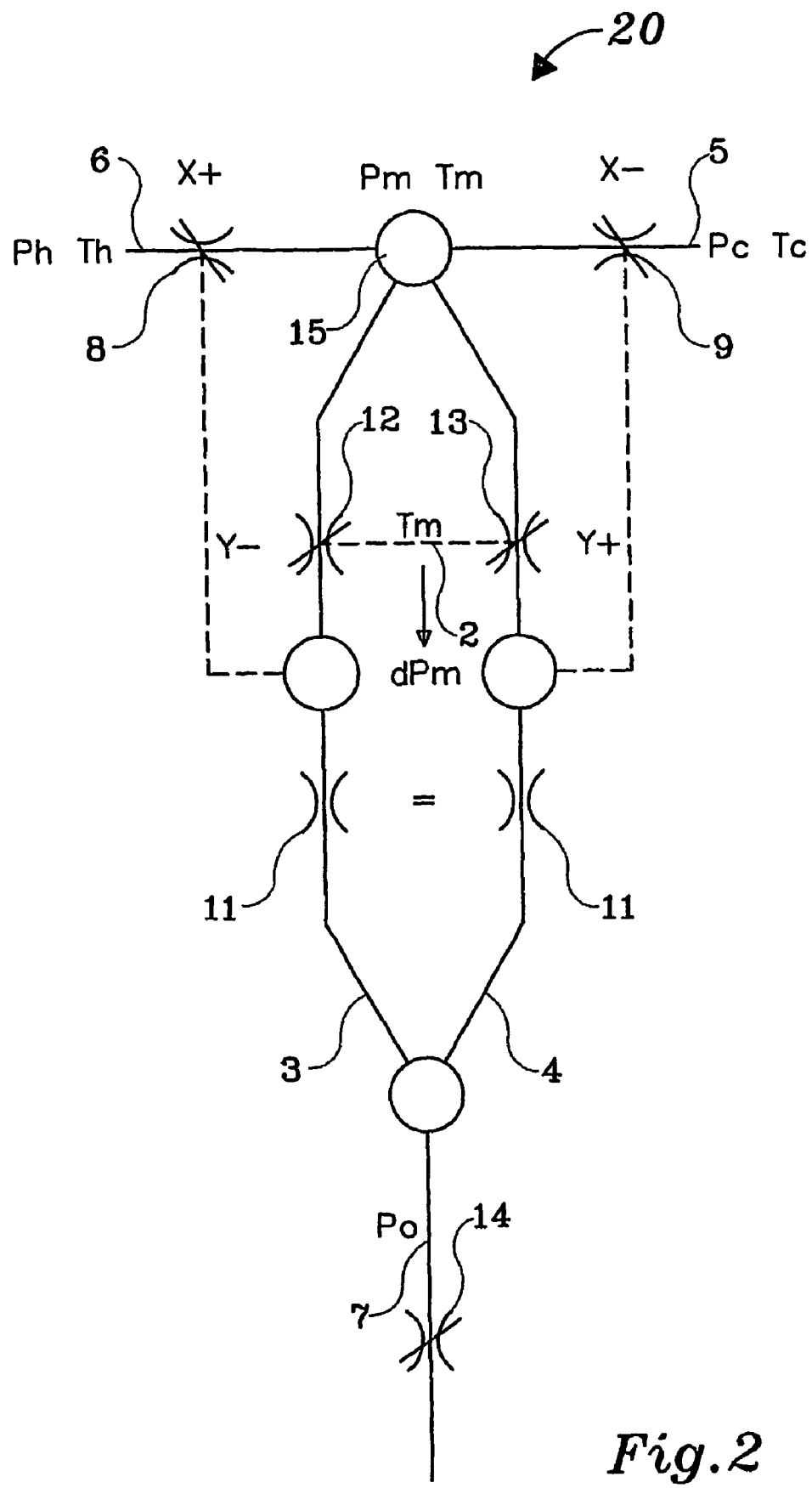
FIG. 2 illustrates an indicative flow diagram of a mixing valve, in accordance with another embodiment of the present invention, having a sensing element at entry ports of the divided flow.

Referring now to FIG. 2 there is seen a schematic flow diagram indicating the operation of a mixing valve system 20, in accordance with another preferred embodiment of the present invention. Unlike as seen in FIG. 1, a temperature-sensing element 2, associated with divided stream valves 12 and 13, is disposed in the divided flow component streams 3 and 4 emanating from mixing chamber 15, and restrictors-type flow divider 11, are disposed in each stream prior to re-combining the two component streams 3 and 4 into outlet valve 14. A change in temperature Tm sensed by sensor 2 causes a pressure differential dPm, which provides a change in setting of inlet valves 8 and 9. Flow divider 11 may be adjustable in order to enable presetting of a selected outlet temperature Tm.

Figure 7:
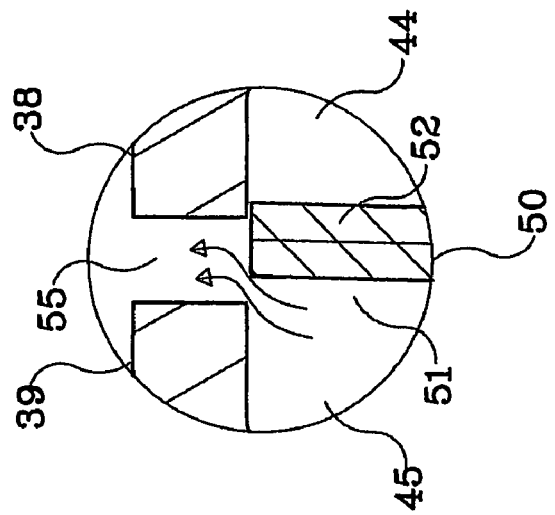
FIG. 7 illustrates an enlargement of indicated area "B" in FIG. 6.

Referring now to FIGS. 3-7 there is seen a spool assembly 30 in accordance with an embodiment of the present invention. FIG. 3 illustrates a cross-section taken along line 1-1 (FIG. 4) and FIG. 4 illustrates a cross-section taken along line 2-2 (FIG. 3). FIGS. 5 and 7 illustrate detail "A" (FIG. 3) and detail "B" (FIG. 6), respectively. A length of pipe serves as a spool 31, machined to a predetermined external diameter and threaded to receive substantially similar flanges 33 each having one or more apertures 34, a recess 35 and a concentric groove 36. Hot and cold water enter spool 31, which has one or more preferably conical outlet apertures 37, centrally disposed therein to permit mixed water flow therethrough. The interior of spool 31 serves as a mixing chamber 32. Two substantially similar discs 38 and 39 each have concentric recesses 44 and 45, one or more radial grooves 41 and one or more apertures 43 formed therein. A bimetal disc 50 having a coaxial aperture is disposed centrally to spool 31 between two opposing discs 38 and 39 which are fixably attached to the mid-portion of the pipe by flanges 33, so as to clamp bimetal disc 50 therebetween. Bimetal disc 50 is positionally adjusted to the center of opening 37 to provide an equal water flow on either side of bimetal disc 50. Bimetal disc 50 is further disposed such that a high expanding side 51 faces towards recess 45 and a low expanding side 52 faces towards recess 44. Radial grooves 41 are arranged to align with conical apertures 37 to provide fluid flow communication therethrough.

Figure 6:
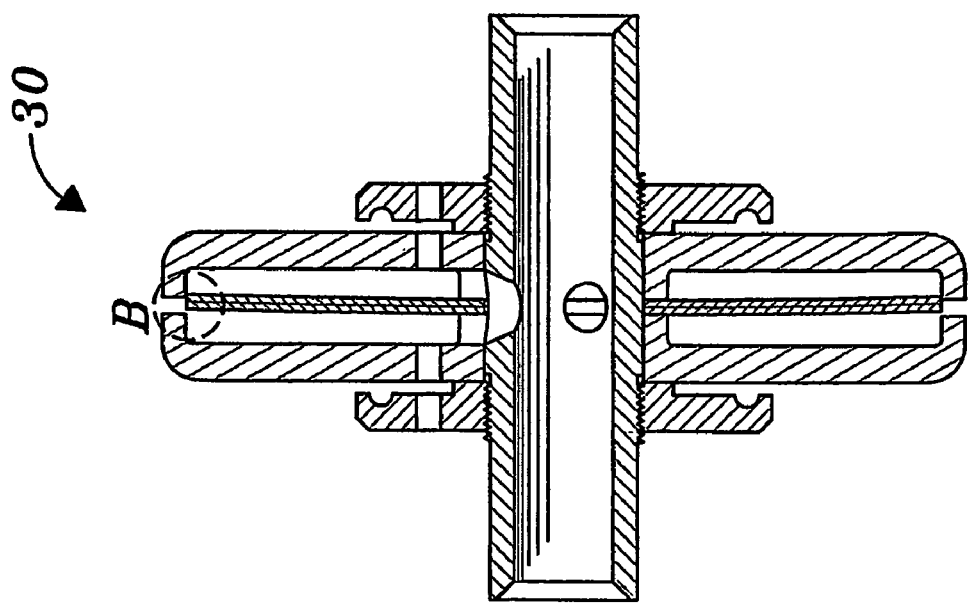
FIG. 6 illustrates the cross-sectional view of the spool assembly of FIG. 3, indicating the operating principle thereof.

Bimetal disc 50 is formed having an outer diameter of a predetermined size, which is slightly smaller by a predetermined measurement than the outer diameter of recesses 44 and 45. There is formed an outer concentric gap 55 between discs 38 and 39 which is slightly wider than the thickness of bimetal disc 50 by a predetermined increment. A detailed view "A" (FIG. 3) is seen in FIG. 5, indicating a fluid flow path between discs 38 and 39 through concentric gap 55, and both sides 51 and 52 of bimetal disc 50. A change in the temperature of the mixed water stream causes a deflection of the periphery of bimetal disc 50 as seen in FIGS. 6 and 7, such that the rate of flow from recess 45 increases and the rate of flow from recess 44 decreases.

Figure 9:
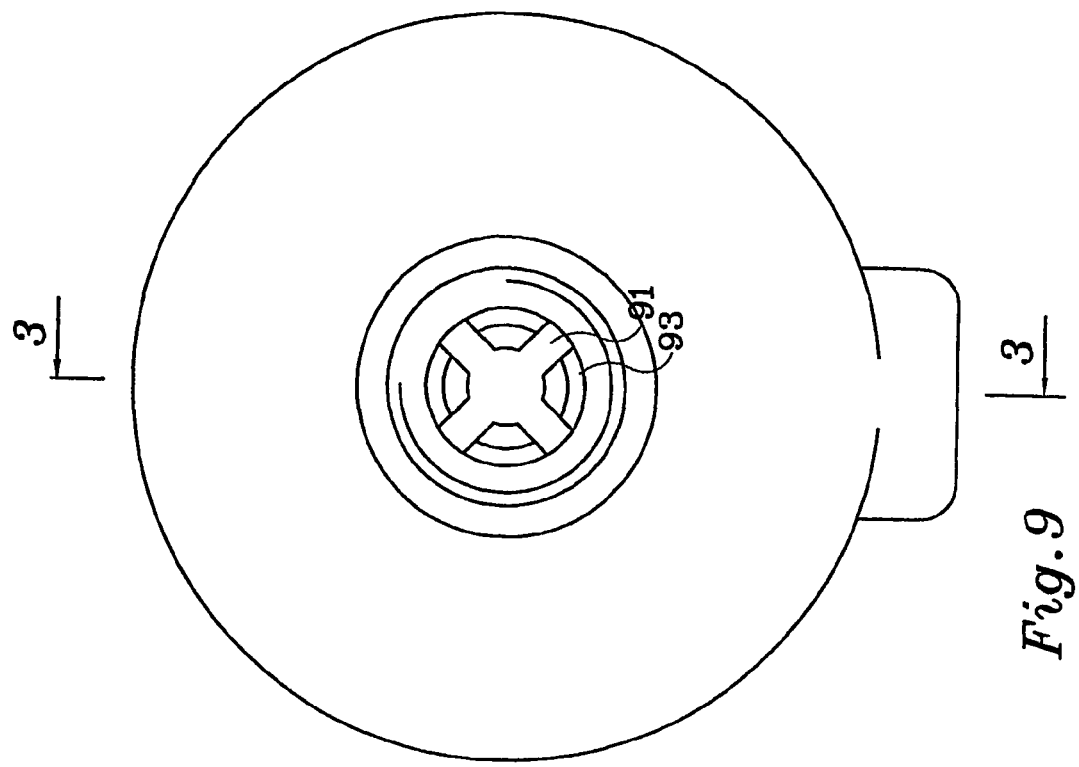
FIG. 9 illustrates an end view of the thermostatic mixing valve of FIG. 8.
Figure 8:
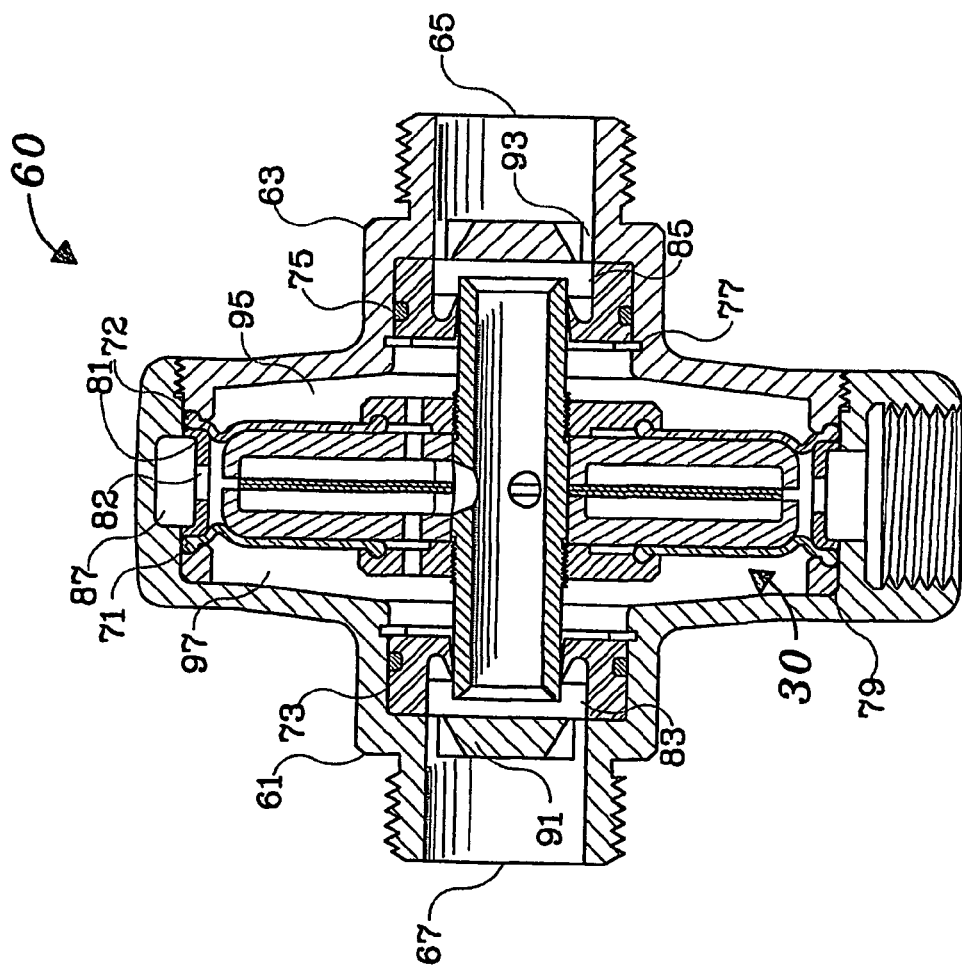
FIG. 8 illustrates a cross-sectional view of a thermostatic valve including the spool assembly shown in FIG. 3, disposed within a housing.

Referring now to FIGS. 8 and 9 in conjunction with FIGS. 4-7, in accordance with an embodiment of the present invention, there is seen a cross-sectional view (FIG. 8) taken along line 3-3 (FIG. 9) of an end view of a mixing valve assembly 60, constructed and operative in accordance with the present preferred embodiment of the present invention. Mixing valve assembly 60 includes a housing 61 with a closure 63 fixably screwed thereto. Closure 63 has a cold water inlet 65 formed coaxially therein including a threaded connection for attaching piping (not shown) to inlet 65. Housing 61 is formed having a coaxial hot water inlet 67 and a mixed water outlet 69 formed radially therein. Spool assembly 30 (as disclosed hereinabove in relation to FIGS. 3-7) is disposed within housing 61, and elastically attached thereto, by means of two substantially similar elastic diaphragms 71 and 72, semi-elastic seals 73, o-rings 75, clips 77, a spacer ring 79, and an exit ring 81. Exit ring 81 has a plurality of orifices 82 formed therein to provide fluid flow therethrough. Spool 31 is slidingly supported at both extremities by seals 73. Any difference in pressure between pressure chambers 95 and 97, formed respectively between diaphragm 71 and housing 61 and between diaphragm 72 and closure 63, will result in an axial sliding movement of spool 31 through seals 73. At the extremity of such movements, either end of spool 31 closes against valve seats 91.

Hot and cold water enters through inlet ports 67 and 65 through openings 93 around the valve seats 91 into valve spaces 83 and 85 respectively, and thereafter enters mixing chamber 32. The water pressure in chamber 32 acts substantially equally in both directions, such that the spool 31, having internal conical ends in order to minimize the contact area with seats 91, is not influenced by pressure differences between hot and cold supply pressures.

When the mixed water stream temperature Tm is at a preselected value, bimetal disc 50 is substantially planar and the two component streams exit from recesses 44 and 45 (as indicated in FIG. 5) substantially equally on both sides of bimetal disc 50 through gap 55 such that the flow rate on each side is approximately equal to that through one or more grooves 41. The exiting water stream flows through orifices 82 in exit ring 81 into an annular aperture 87 formed in housing 61, thereafter discharging from exit port 69.

Assuming now, by way of a non-limiting example, that the cold water pressure Pc temporarily falls. The mixed water stream temperature Tm rises and bimetal disc 50 reacts as seen in FIG. 6, and FIG. 7, which illustrates detail "B" (FIG. 6). Since the external diameter of bimetal disc 50 is slightly smaller than the external diameter of recess 44, the circumference of disk 50 will distort, entering into recess 44 of disc 38, effectively reducing or blocking the flow of water from recess 44 and simultaneously allowing an increased flow from recess 45. Apertures 34 and 43 and recess 35 (FIG. 3) provide fluid flow communication between each of recesses 44 and 45 and pressure chambers 45 and 97 respectively. Apertures 34 and 43 provide pressure equalizing connections, respectively, between chambers 44 and 95, and chambers 45 and 97 and are sized to provide the spool an oscillation damping effect.

The distortion or deflection of bimetal disc 50 with respect to gap 55, consequent to the rise in temperature Tm, causes an increase in pressure in recess 44 and thereafter in pressure chamber 95 and a corresponding decrease in pressure in recess 45 and pressure chamber 97. The pressure difference dPm will act on spool assembly 30, and particularly on diaphragms 71 and 72 and bimetal disc 50, thereby to slidingly push spool assembly 30 away from cold-water inlet 65 and towards hot water inlet 67. As a result spool 31 reduces the hot water flow and increases the cold-water flow. The mixed water temperature falls until the temperature is substantially restored to the preselected temperature, and bimetal disc 50 reverts to a planar state.

When the bimetal disc 50 is planar there is no longer a pressure differential to alter the position of assembly 30 and new equilibrium conditions are obtained, with spool assembly 30 taking up a new equilibrium position at the pre-selected temperature. It is for this reason that the mixing valve control mechanism is not a directly driven proportional control, but a true servo-feedback mechanism, thus avoiding either cycling operation or an equilibrium temperature differing from the pre-selected temperature Tm.

The mechanism disclosed hereinabove, in accordance with a preferred embodiment of the present invention, is simple in construction, easily understood and yet very accurate in response. The mechanism is set to a fixed preselected temperature by fitting a bimetal disc that is planar at the preselected temperature, but without means for the user to preselect the temperature. This embodiment is in accordance with the flow diagram seen in FIG. 1 wherein the flow divider 11 such as fixed restrictors are represented by grooves 41 dividing the main mixed water stream to provide two substantially similar component streams. The adjustable, mechanically coupled divided stream valves 12 and 13 seen in FIG. 1 are represented by the distortion of the periphery of bimetal disc 50 acting in relation to gap 55.

Figure 10:
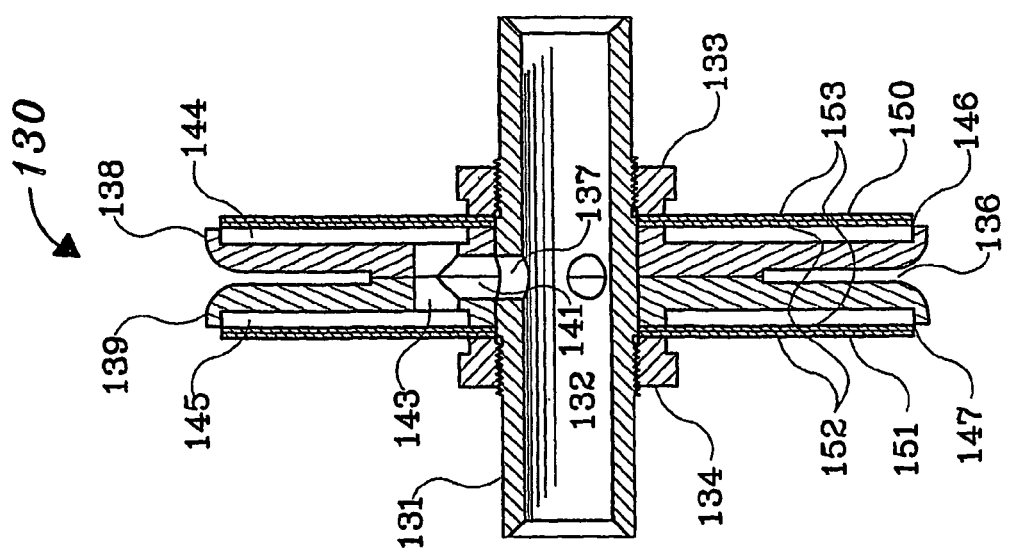
FIG. 10 illustrates a cross-sectional view of a spool assembly having two thermal sensing elements, in accordance with another embodiment of the present invention.

In FIGS. 10-15 there are seen two different mixing valve control mechanisms that allow preselection of the outlet temperature by the user. Referring now to FIG. 10 there is seen, in accordance with another preferred embodiment of the present invention, a cross-sectional view of a spool assembly 130. Assembly 130 includes a spool 131 having one or more centrally disposed apertures 137, two substantially similar discs 138 and 139, two substantially similar bimetal discs 150 and 151 and two locking nuts 133 and 134.

Discs 138 and 139 have concentric recesses 144 and 145 formed in one face thereof and one or more radial grooves 141 formed in the opposing face thereof. Corresponding to each of one or more grooves 141, discs 138 and 139 have one or more apertures 143 aligned with grooves 141 and a coaxial central aperture (not indicated) to closely fit over spool 131. Discs 138 and 139 also have a concentric stepped section 136 disposed in the periphery of the opposing faces thereof.

When discs 138 and 139 are fitted, as indicated, to the machined center portion of spool 131, a diaphragm 171 (as disclosed hereinbelow in relation to FIG. 12) is clamped within stepped sections 136. Further, each opposing pair of radial grooves 141 effectively forms an aperture to be aligned with aperture 137 in spool 131. There is thereby provided a free fluid flow communication from mixing chamber 132 within spool 131 through aperture 137, the aperture formed from a pair of opposing grooves 141 and apertures 143 into each of recesses 144 and 145.

Substantially similar bimetal discs 150 and 151 are fitted over spool 131 against discs 138 and 139 and secured in position by locking nuts 133 and 134. High and low expansion sides respectively 152 and 153 of each of bimetal discs 150 and 151 are disposed in the same direction. The fluid flow area through gaps 146 and 147 between the periphery of bimetal discs 150 and 151 and discs 138 and 139, respectively, is predetermined so as to provide substantially equal fluid flow therethrough (as disclosed hereinabove in relation to FIG. 5) from each of recesses 144 and 145 into pressure chambers 195 and 197 of mixing valve 160 (as disclosed hereinbelow in relation to FIG. 12). Apertures 143 in each of discs 138 and 139 provide free fluid flow into recesses 144 and 145 which flow rate is greater than the maximum flow rate through gaps 146 and 147.

An increase in the temperature of water passing through recesses 144 and 145 causes a thermal distortion or deflection of the periphery of bimetal discs 150 and 151 with respect to discs 138 and 139. Following this distortion, the periphery of bimetal discs 150 and 151 moves so as to increase gap 146 and to decrease gap 147. Consequently, the flow rate from recess 144 into pressure chamber 195 increases and the flow rate from recess 145 into pressure chamber 197 decreases by a substantially equal rate.

Figures 12, 13:
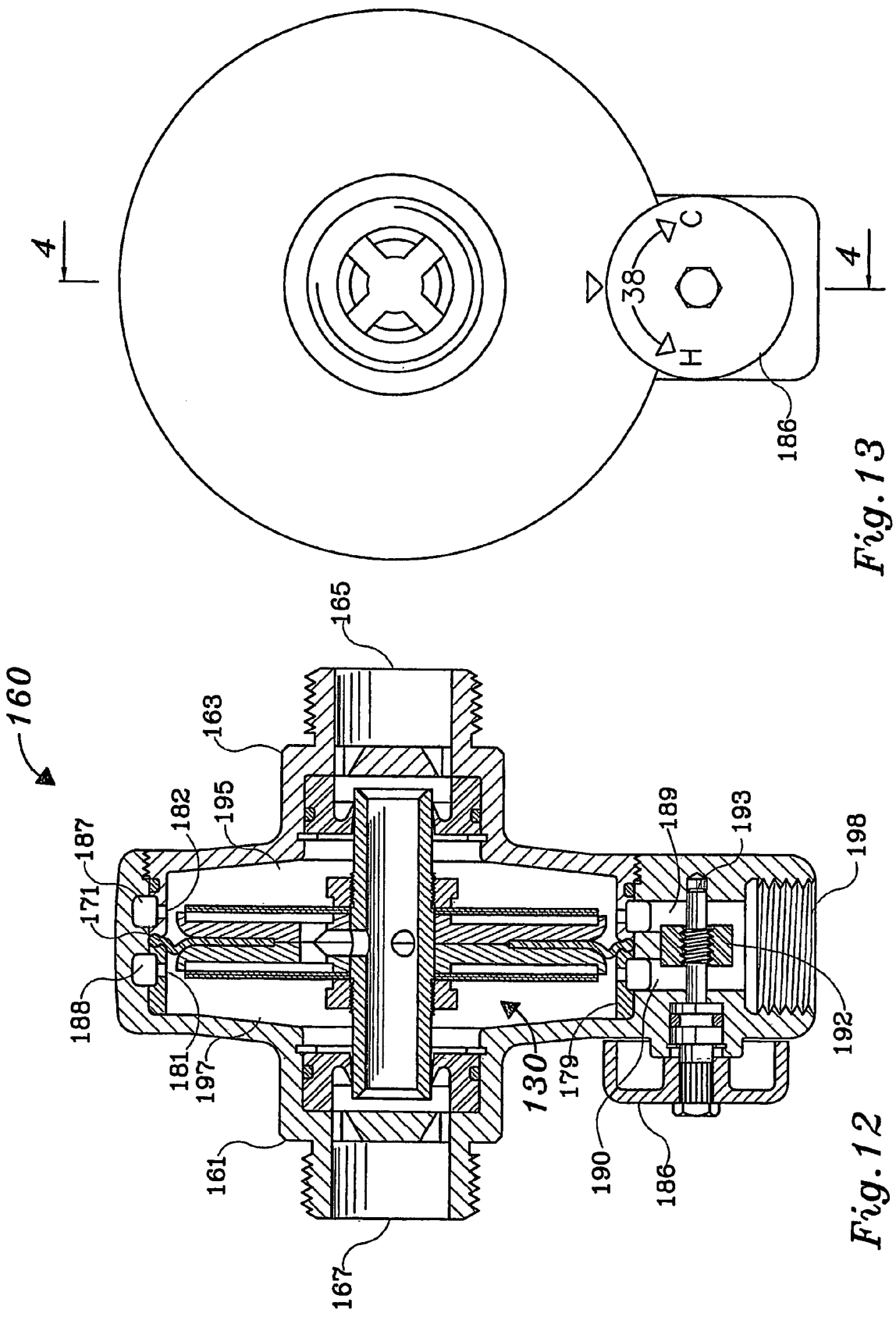
FIG. 12 illustrates a cross-sectional view of a thermostatic mixing valve including the spool assembly as shown in FIG. 10, disposed within a housing.
FIG. 13 illustrates an end view of the thermostatic mixing valve of FIG. 12.

Referring now to FIGS. 12 and 13 in conjunction with FIG. 10, there is seen a cross-sectional view (FIG. 12) taken along line 4-4 of an end view (FIG. 13) of a mixing valve 160 (similar to that disclosed hereinabove in relation to FIGS. 8 and 9), including a housing 161 and a closure 163 fixably screwed into housing 161. Slidingly mounted within housing 161 and closure 163 is spool assembly 130. However, in accordance with another preferred embodiment of the present invention, only one elastic diaphragm 171 is disposed between discs 138 and 139 within steps 136 and the interior wall of housing 161. The peripheral edge of diaphragm 171 is clamped between a ring 179 and closure 163.

Furthermore, water exits housing 161 from pressure chambers 195 and 197, respectively, through holes 181 in a ring 179 and through holes 182 in a closure 163, flowing into and through exit passages 187 and 188. The water exits passages 187 and 188 through control apertures respectively 189 and 190 into outlet 198, from which the water flows to a user facility such as a shower or kitchen wash basin (not shown). In order to regulate the flow from passages 187 and 188 into outlet 198, a regulating knob 186 is rotated so as to rotate regulator screw 193. This rotation causes threaded block flow adjustor 192 to move proximally or distally with respect to 18. knob 186, thereby restricting the flow respectively from control apertures 189 and 190, comparable, in terms of water flow, to gaps 146 and 147.

Mixed water flows from mixing chamber 132 through aperture 137, and groove aperture 141, dividing into two separate component streams through apertures 143, and passing into recesses 144 and 145. From recesses 144 and 145 mixed water flows through gaps 146 and 147, respectively, into pressure chambers 195 and 197 on either side of diaphragm 171. A variation of pressure in either of chamber 195 and 197, causing a pressure difference therebetween, provides a sliding displacement of spool assembly 130 towards either cold water or hot water inlets 165 or 167 respectively.

When disposing flow adjustor 192 midway between control apertures 189 and 190, there is substantially no pressure difference between chambers 195 and 197 and, as a result, spool assembly 130 does not change position. Adjusting knob 186 to move adjustor 192 proximally towards knob 186 increases the pressure in chamber 197 and reduces the pressure in chamber 195. Spool assembly 130 moves towards cold water inlet 165 and away from hot water inlet 167, increasing the hot water flow and decreasing the cold water flow into mixing chamber 132. Because of the increase in mixed water temperature, bimetal discs 150 and 151 will act simultaneously to reduce spacing 147 and to increase spacing 146. Additional water now flows into chamber 195 and less into chamber 197, until a flow equilibrium is achieved, such that the pressure difference between chambers 195 and 197 is reduced substantially to zero, providing a new preselected mixed water temperature. The new preselected mixed water temperature now remains stable despite variations of inlet temperatures or pressures. This embodiment of the present invention is in accordance with the disclosure hereinabove in relation to FIG. 2. The outlet restrictors type flow divider 11 are represented by the adjustable outlets 189 and 190, which are adjustable by the user.

According to an alternative embodiment of the present invention, adjustment knob 186 is provided with a disengagable stop mechanism to limit the range of the preselected temperature to avoid the risk of inadvertently setting too high a temperature.

Figure 11:
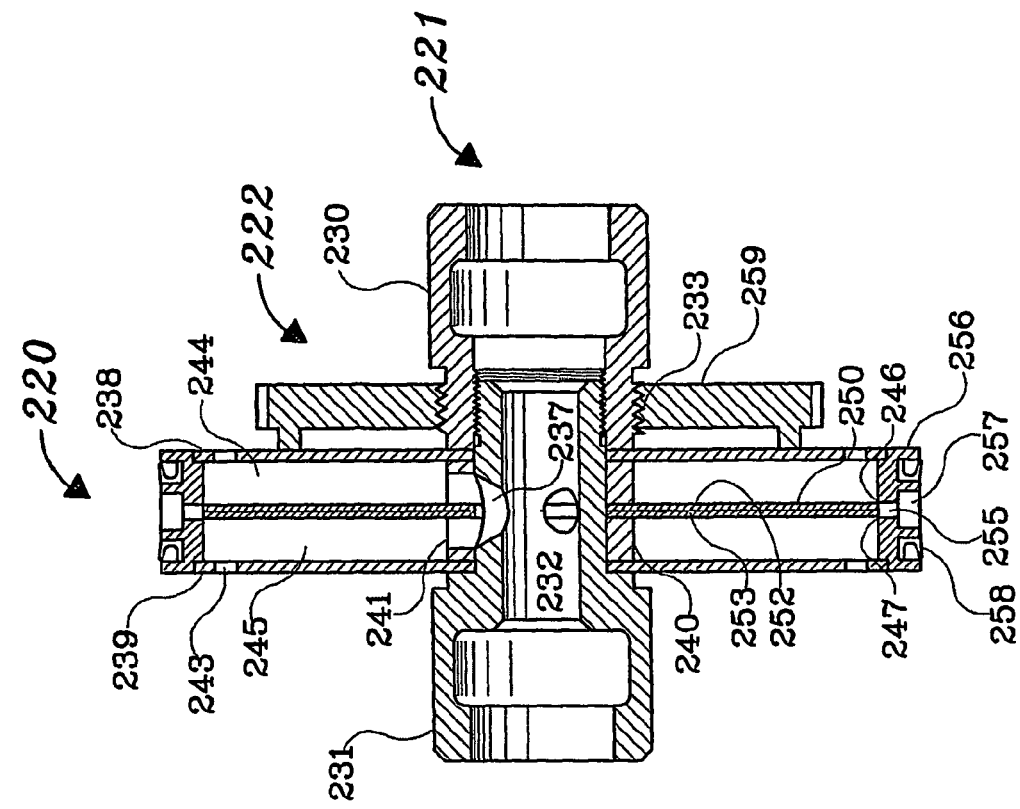
FIG. 11 illustrates a cross-sectional view of a spool assembly, in accordance with a further embodiment of the present invention.

Referring now to FIG. 11 there is seen, in accordance with a further preferred embodiment of the present invention, a cross-sectional view of a spool assembly 220, including a tubular spool 221, consisting of two screwed together threaded spool sections 230 and 231. Spool section 231 has one or more conical outlet apertures 237 to allow flow from mixing chamber 232, which is coaxially formed within spool section 231. A spool sub-assembly 222 includes an adjusting gear 259 having a threaded coaxial opening, which is screwed over a threaded portion 233 of spool section 230. Also, there are included two spring discs 238 and 239, a bimetal disc 250, two spacer rings 240 each having one or more apertures 241, and a peripheral ring 256.

Spring discs 238 and 239 are formed of an elastic material such as flat stainless steel spring, each having one or more peripheral apertures 243 and a coaxial mounting opening (not indicated). Bimetal disc 250 is formed having a high expansion side 252 and a low expansion side 253, and has a coaxial mounting opening (not indicated). Peripheral ring 256 has a predetermined internal diameter, which is slightly larger than the external diameter of bimetal disc 250, thereby to provide movement clearance therebetween. Peripheral ring 256 has a radial groove 255 centrally formed in the internal circumference of ring 256. Groove 255 has a predetermined width which is slightly wider than the thickness of bimetal disc 250. Peripheral ring 256 also has a plurality of orifices 257 formed centrally therein, which are in flow communication with interior groove 255.

Spool assembly 220 is constructed by disposing, in sequence, on to spool section 231, spring disc 239, a first spacer ring 240 with each aperture 241 aligned with outlet aperture 237, bimetal disc 250 with a high expanding side 252 facing away from spring disc 239, a second spacer ring 240 with each opening 241 aligned with outlet aperture 237, peripheral ring 256, spring disc 238, and spool sub-assembly 222, which is screwed on to spool section 231 to complete the construction. Spring disc 239 is peripherally prestressed to provide compression contact with ring 256. Further, rotation of gear 259 in relation to spool 221 displaces ring 256 in an axial direction towards spring disc 239, and away from gear 259 or vice versa. Ring 256 is fitted with two C-section elastic seals 258 facing outward from the center thereof. Seals 258 are designed for low friction, while absolute sealing is not essential, and these functionally replace diaphragms 71, 72 and 171 (as disclosed hereinabove in relation to FIGS. 8 and 12).

Referring now to FIGS. 14-15 in conjunction with FIG. 11, there is seen a cross-sectional view (FIG. 14) taken along line 5-5 of an end view (FIG. 15) of a mixing valve 260, which is disposed within a housing 261 and housing closure 263, spool assembly 220 (as disclosed herein above in relation to FIG. 11). Two inserts 265 and 267, preferably but not necessarily formed from a plastic material, protrude into housing closure 263 and into housing 261 respectively. Inserts 265 and 267 provide a slidable mounting within the internal diameter of spool sections 230 and 231, respectively, thereby to allow spool assembly 220 to move axially within housing 261. An outer ring 279, preferably but not necessarily formed from a plastic material, is disposed within housing 261. Ring 279 has a plurality of apertures 281 formed centrally therein to provide flow communication with a discharge passage 287. Ring 256 and seals 258 are in slidable contact with ring 279 to substantially prevent flow communication between volumes 295, 297 and the discharge passage 287 within valve 260 on either side of assembly 220. In the event that there is a pressure differential between volumes 295 and 297, such pressure differential induces spool assembly to move in a piston-like fashion.

A pinion gear 293 is fixably attached at a predetermined distance from a distal end (relative to the user) of pinion shaft 288 within closure 263, and is rotatably operative by means of a knob 286 fixably attached to a proximal end of pinion shaft 288. Pinion gear 293 is operatively engaged with gear 259 so as to allow for free axial movement of spool assembly 220. In addition, a distal end of pinion shaft 288 is inserted through one of apertures 243 thereby to prevent rotation of spool assembly 220 while pinion gear 293 rotates. Rotation of knob 286 rotates gear 259, which in turn advances or retracts along thread 233 relative to spool 221, thereby inducing a corresponding displacement of ring 256 to reposition groove 255 of ring 256 in relation to the periphery of bimetal disc 250. Hot and cold water streams, entering spool 221 through hot and cold water inlet inserts 267 and 265, respectively, mix in mixing chamber 232, and exit through aperture 237. Thereupon the mixed fluid stream divides into two component streams passing through apertures 241 into volumes 244 and 245 on either side of bimetal disc 250. Apertures 241 are sized to allow a water flow substantially similar to the rate of flow through either one of the gaps 246 or 247, when bimetal disk 50 is in a planar configuration. Thereafter, mixed water streams exit volumes 244 and 245 through gaps 246 and 247 on either side of the periphery of bimetal disc 250, to exit spool assembly 220 through groove 255 and orifices 257 and 281 into outlet passage 287 to exit valve 260 through outlet 269. Apertures 243 equalize pressures, respectively, between chambers 245 and 297, and chambers 244 and 295, and are sized to provide a damping effect on movement of spool assembly 220.

To change the preselected mixed water temperature knob 286 is rotated, for example, in a counter-clockwise direction causing gear 259 to advance thereby displacing peripheral ring 256 distally relative to the user and to bimetal disc 250. Displacement of ring 256 provides a decrease in flow from volume 244 and an increase in flow from volume 245, respectively, through the gaps 246 and 247 between respective sides 252 and 253 of bimetal disc 250 and of groove 255. Consequently, the pressure in volume 245 falls and the pressure in 244 rises, providing a corresponding decrease of pressure in volume 297 and an increase of pressure in volume 295. Thereby moving spool assembly 220 in a piston-like fashion, away from cold water inlet insert 265 and towards hot water inlet insert 267. This movement of spool assembly 220, therefore, provides an increase in hot water flow and a corresponding decrease in cold water flow with the movement of spool valve seat 266 relative to valve orifices 264. The subsequent rise in mixed water temperature causes bimetal disc 250 to distort to restore equilibrium at a new preselected and higher temperature. In accordance with another embodiment of the present invention, knob 286 is provided with a disengagable stop mechanism to limit the range of the preselected temperature to avoid the risk of inadvertently setting too high a temperature.

To provide a stable, preselected mixed water temperature, any change in temperature or pressure of the hot or cold water supply causes a deflection or displacement of the periphery of bimetal disc 250 with respect to slot 255, thereby changing the relative sizes of gaps 246 and 247. Resultant relative pressure changes in volumes 295 and 297 cause spool assembly 220 to move axially to adjust the relative inlet flows of hot and cold water into mixing chamber 232. Consequently, the mixed water temperature is restored to substantially the preselected temperature.

Based on the above example, in accordance with an embodiment of the present invention, subsequent to a complete drop of pressure, for example in the cold water supply entering inlet insert 265, spool movement occurs rapidly so as to substantially close off hot water inlet 267, thereby preventing possible injury to the user. The valve arrangement for controlling the hot and cold fluid flows in accordance with this embodiment of the present invention provides a faster and more positive flow closure of the hot inlet stream in the event of cold fluid inlet flow termination or a substantial reduction thereof. Furthermore, the direction of flow through each inlet is operative to close that same inlet.

As disclosed hereinabove, the alternative mixer valve mechanisms, in accordance with alternative embodiments of the present invention, include a relatively few number of parts, very few moving parts and yet have the benefit of simplicity of installation and of use. Furthermore, a preselected mixed water temperature is maintained at a stable value, regardless of fluctuations in inlet temperatures and pressures. As a result of high exposure and good contact with both sides of the bimetal discs to mixed water flow, response time is short. Reliability is maintained over a substantial lifetime.

The clogging problems common in many other thermostatic servo-controlled mixing valves have been eliminated by removal of any relatively lengthy and narrow flow passages. In prior art mixing valves where a small sample flow through a relatively narrow passage is utilized to provide thermal control, the possibility of a blockage is manifestly high and the response is slow. Dividing the full mixed water flow into two substantially equal component streams through the spool assembly 220 provides a turbulent flow resulting in a rapid and sensitive response by the one or more bimetal discs, thus eliminating the possibility of blockage evident in other types of mixing valves.

In accordance with alternative embodiments of the present invention, other thermally responsive devices provide a displacement or distortion movement to operate a double-acting valve mechanism, which in turn controls the relative rates of flow of the two component streams thereby inducing a pressure differential therebetween. Such thermal responsive devices include, but are not limited to, bimetal rods and coils, thermally expandable rods, and fluid operable thermally responsive elements such as a "wax thermostat." These and other alternative thermal responsive devices are well known to those skilled in the art.

Furthermore, in accordance with other embodiments of the present invention, there are provided operating mechanisms other than a cylindrical axially operating spool assembly (as disclosed herein above in relation to FIGS. 3-15).

Figure 17:
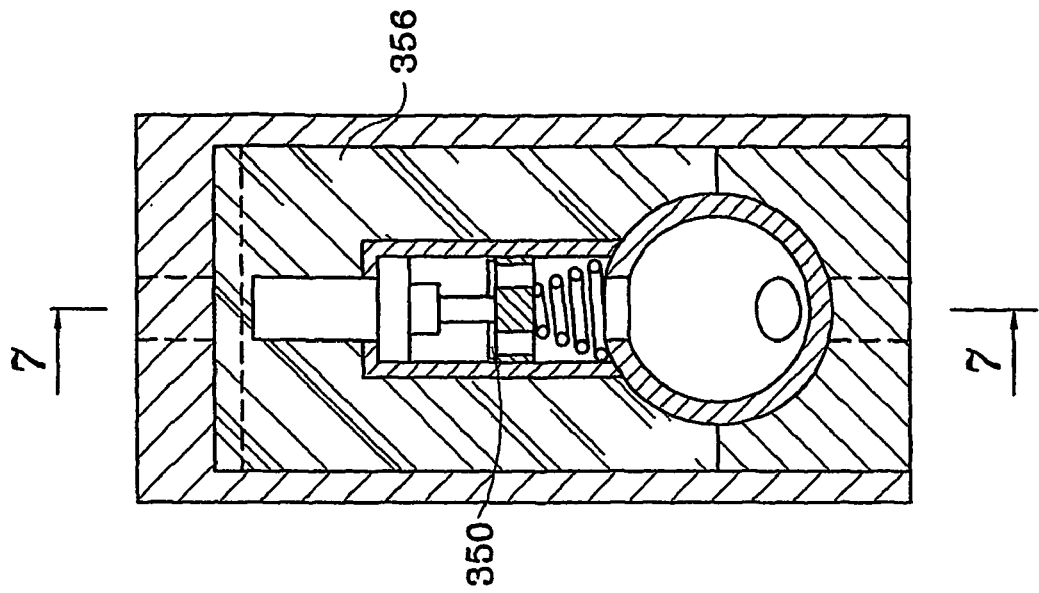
FIG. 17 illustrates a cross-sectional side view of the thermostatic mixing valve of FIG. 16.
Figure 16:
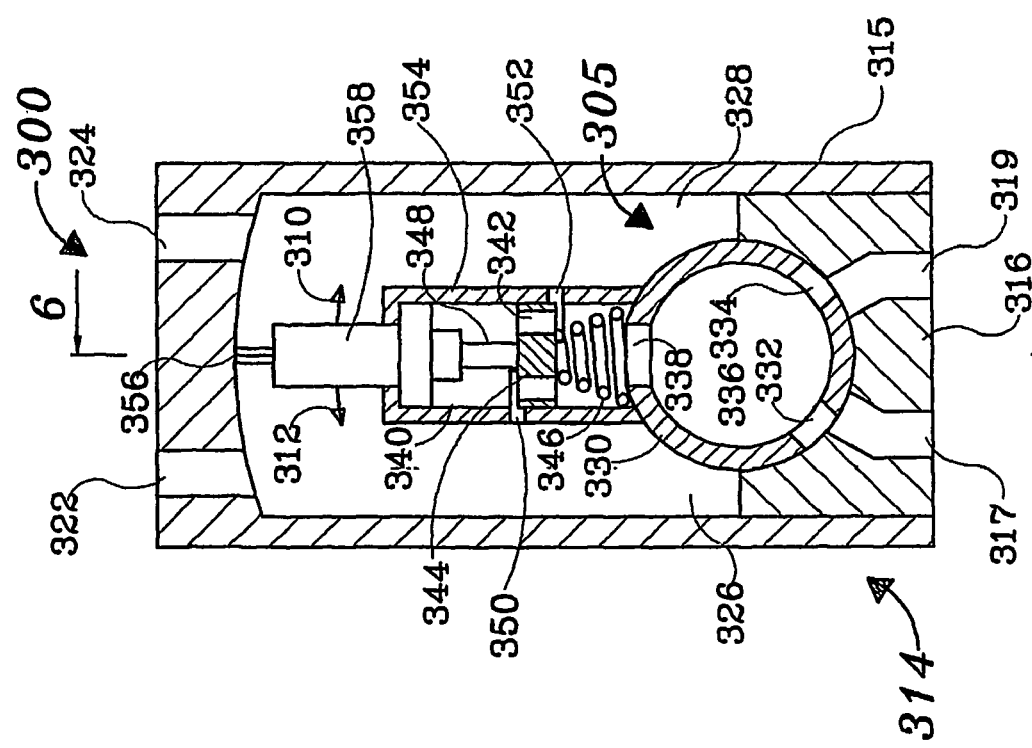
FIG. 16 illustrates a cross-sectional front elevation view of a thermostatic mixing valve having a ball-type spool assembly, in accordance with an additional embodiment of the present invention.

Referring now to FIG. 16-17, there is seen a thermostatic mixing valve 300 having a ball or sphere-type spool assembly 305 rotationally displaced as indicated by arrows 310 and 312 within a housing 314. Housing 314 includes a housing closure 315 to facilitate assembly of mixing valve 300 and a valve assembly seat portion 316, which has hot and cold water inlets 317 and 319 respectively, and two outlets 322 and 324 for the two component streams. Housing outlets 322 and 324 are substantially similar, thereby ensuring substantially equal rates of flow therethrough, given equal pressures in volumes 326 and 328.

A substantially spherical hollow spool 330 has hot and cold water inlets 332 and 334 respectively which are disposed to interactively engage with hot and cold housing inlets 317 and 319 such that clockwise rotation increases the flow of cold water and decreases the flow of hot water and, conversely, anti-clockwise rotation decreases the cold water flow and increases the hot water flow. The inner volume of sphere 330 serves as a mixing chamber 336 from which a mixed fluid stream of water flows through an outlet 338 into thermal chamber 340, passing through one or more apertures 342 in an axially slidable disc valve 344 to fill thermal chamber 340. Spring 346 serves to retain disc valve 344 in contact engagement with a thermal wax operated thermostat rod 348, at the proximal end thereof relative to disc valve 344.

The mixed water stream exits thermal chamber 340 through two substantially semi-circular slot openings 350 and 352 in thermal chamber side-wall 354. Slot opening 350 is substantially disposed on the side of disc valve 344 distal to sphere 330, and slot opening 352 is disposed proximal to disc valve 344. Disc valve 344 is arranged to obscure substantially equal portions of slots 350 and 352 in an equilibrium position, in which the mixed water stream has a temperature equal to a preselected temperature. In this equilibrium position, disc valve 344 controls the flow through slots 350 and 352 at substantially equal rates as two component streams entering volumes 326 and 328 respectively. Axial movement of disc valve 344 towards sphere 330 increases the flow through slot 350 while decreasing the flow through slot 352 and vice versa, thereby dividing the mixed fluid stream into two variable flow component streams respectively entering volumes 326 and 328 responsive to the axial displacement of disc valve 344. Volumes 326 and 328 are separated therebetween by a vane 356 with peripheral seal arrangement.

Thermal sensor rod 348 is slidably operated by expansion or contraction of wax contained in chamber 358. Movement of rod 348 responsive, for example, to an increase in temperature of the mixed water stream, displaces disc valve 344 proximally relative to sphere 330, increasing the component stream flow through slot 350 into volume 326 while reducing the flow of the other component stream through slot 352 into volume 328. As disclosed hereinabove, housing outlets 322 and 324 are sized to provide substantially similar flows as through openings 350 and 352, respectively, when valve 344 is in a mid-position. An increase of flow into volume 326 and a decrease into volume 328 results in an increase in pressure in volume 326 and a decrease in pressure in volume 328; that is, a pressure differential therebetween. Thereupon, responsive to this pressure differential, spool assembly 305 rotates in the direction indicated by arrow 310, reducing the inflow of hot water through housing inlet 317 and sphere inlet 332 while increasing the flow of hot water through inlets 319 and 334, thereby to reduce the temperature of the mixed water stream to the preselected temperature. A decrease in mixed water temperature will produce a converse series of reactions to restore the mixed water stream to the preselected temperature.

In order to alter the preselected temperature, housing outlets 322 and 324 are connected to a user-adjustable double-acting valve mechanism (not shown, but similar in arrangement to flow adjustor 192 disclosed hereinabove in relation to FIG. 12). For example, to raise the preselected temperature, by reducing the flow through housing outlet 324 and increasing flow through housing outlet 322, a pressure differential between volumes 328 and 326 displaces spool assembly 305 in the direction indicated by arrow 312, thereby increasing the hot water flow through inlet 317 and correspondingly decreasing the cold water flow through inlet 319 until thermal rod 348 adjusts the component flows and eliminates the pressure differential between volumes 328 and 326, so that spool assembly 305 returns to an equilibrium position at the new preselected temperature.

Figure 19:
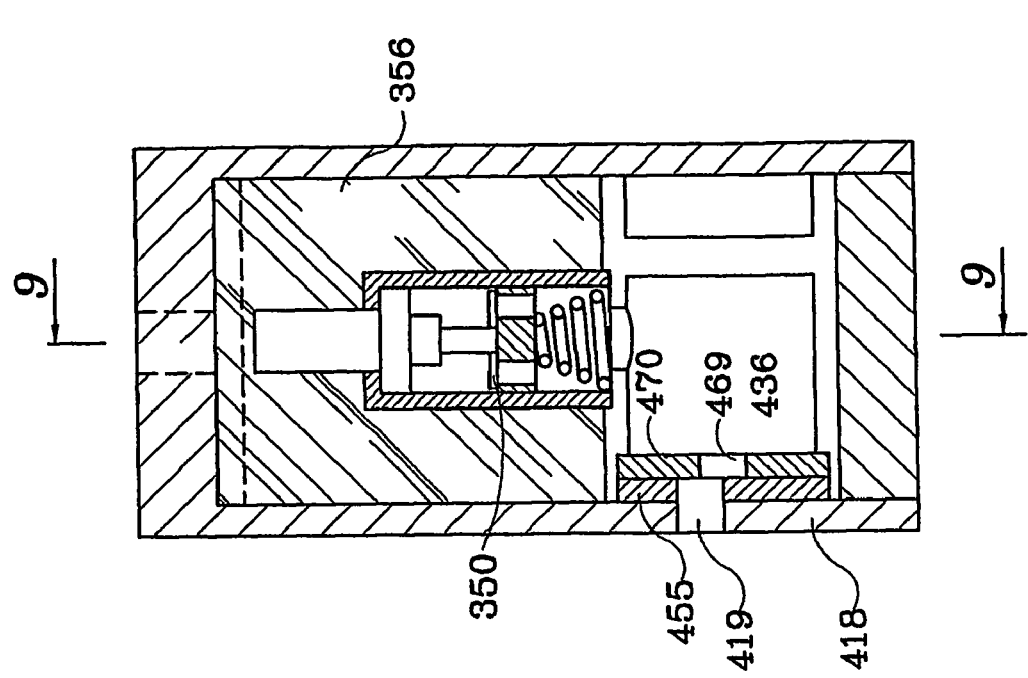
FIG. 19 illustrates a cross-sectional side elevation view of the thermostatic mixing valve of FIG. 18.
Figure 18:
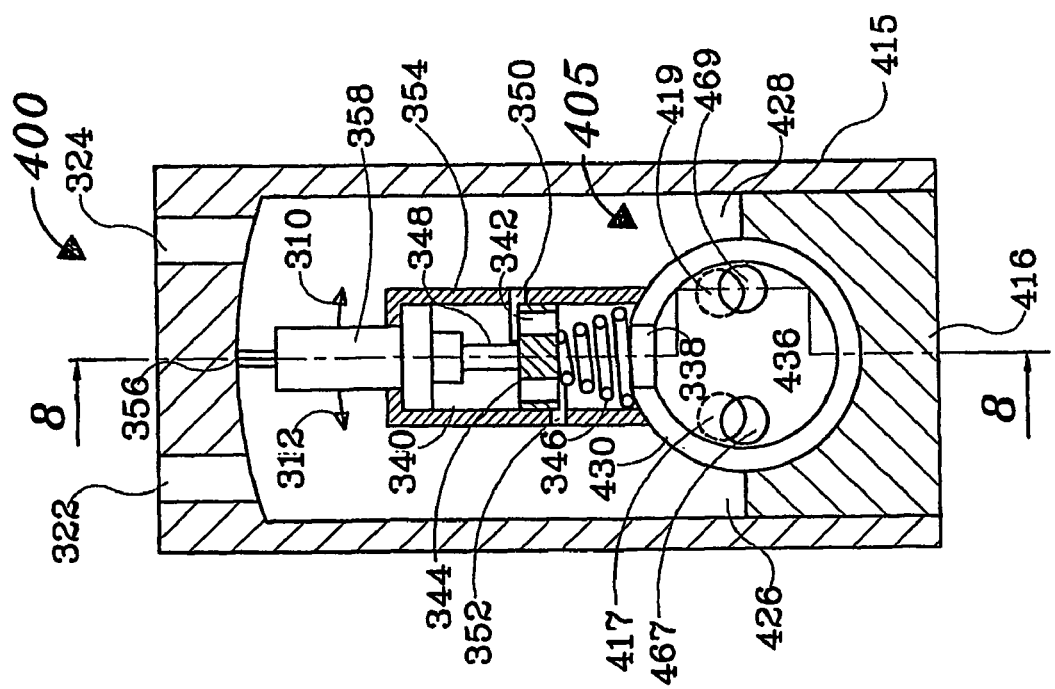
FIG. 18 illustrates a cross-sectional view of a thermostatic mixing valve having a disc-type spool assembly, in accordance with one other embodiment of the present invention.

In accordance with one other embodiment of the present invention, referring now to FIGS. 18 and 19, there is seen a similar mixing valve to that disclosed hereinabove in relation to FIGS. 16-17, but having a spool assembly 405 including a cylindrical spool 430 enclosing a mixing chamber 436. Expansion or contraction of thermal wax contained in chamber 358 slidingly operates rod 348 to move disc 344 against spring 346 causing a variation of flow through openings 350 and 352 in side-wall 354. Mixed water flow leaving mixing chamber 436 through outlet 338 and entering thermal chamber 340 through opening 342, passes into volumes 426 and 428 by thermally adjusted openings 350 and 352, respectively.

A housing 415, closed by a seat 416, has hot and cold water inlets 417 and 419 and has an inlet disc 455 fixably attached internally to housing wall 418, having inlets, which coaxially correspond respectively with housing inlets 417 and 419. Fixably attached transversely to spool 430 is a spool disc 470 having inlets 467 and 469. Spool disc 470 is adjacent to and in sliding rotational engagement with inlet disc 455. Discs 455 and 470 are formed of a material such as polished ceramic for permitting substantially leak resistant slidable contact therebetween. Spool disc inlets 467 and 469 are respectively angularly displaced from housing inlets 417 and 419. As spool assembly 405 rotates, as indicated by arrows 310 and 312, responsive to a pressure differential between volumes 426 and 428, one of hot and cold water inlets 417 and 419 opens to increase the hot or cold water flow therethrough while the other inlet reduces the other water flow therethrough. In all other respects mixer valve 400 functions in a substantially similar manner to mixer valve 300 (FIGS. 16-17).

Figure 20:
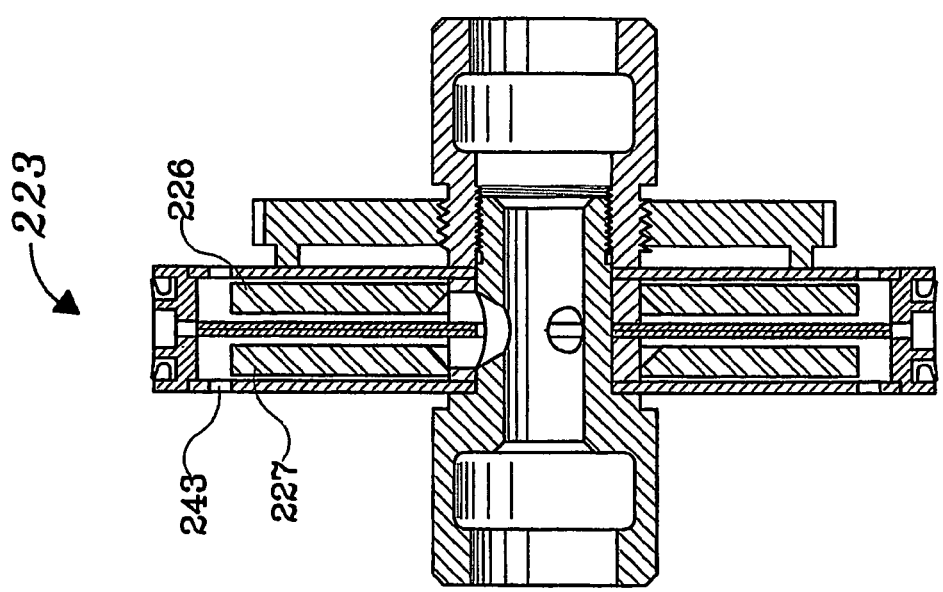
FIG. 20 illustrates a cross-sectional view of a spool assembly identical to the spool assembly of FIG. 11 with the addition of space saving rings.

Referring now to FIG. 20 there is illustrated, in accordance with a further preferred embodiment of the present invention, a cross-sectional view of a spool assembly 223, based on the spool assembly shown and explained in relation to FIG. 11, with the addition of space saving rings 226, 227 located in the internal volume of the spool on both sides of the bimetal disk. The rings are preferably made of plastic material and placed freely in their spaces. The water flows faster from the inlet valves 264 in FIG. 14 to the outlet openings 281 in FIG. 14 such that risk of oscillation is avoided even at low flow conditions as will be explained herein below.

Due to the decrease in water volume of the spool assembly, water temperature is measured by the bimetal disk in a very short time after passing the hot and cold water inlet valves. Bimetal response to any change in mixed water temperature is faster than the mechanical oscillation cycle time related to that flow condition, and conditions feedback phase delay tending to cause excessive response (overshoot) is shorter and effectively prevented in spaces 295, 297 (FIG. 11), as water trapped in these spaces is able to escape only through dumping holes 243.

Also, heat transfer from the water to the bimetal disk is faster due to faster flow rate along the disk surface.

Figure 21:
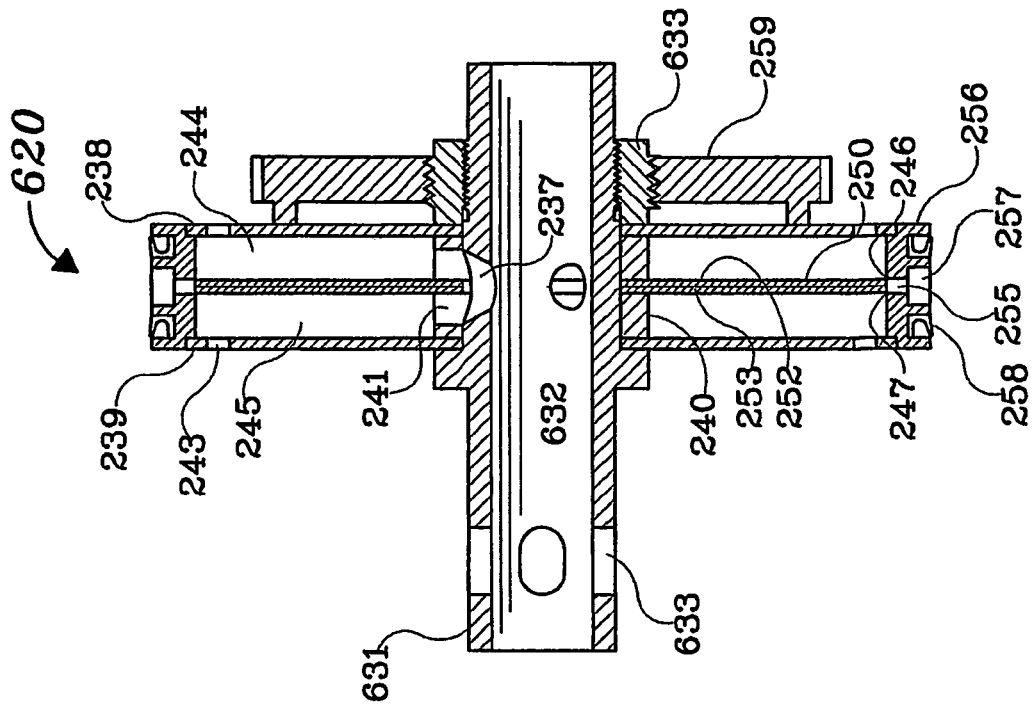
FIG. 21 illustrates a cross-sectional view of a spool assembly with side inlet openings in accordance with a further embodiment of the present invention.

Referring now to FIG. 21 there is illustrated, in accordance with a further preferred embodiment of the present invention, a cross-section view of a spool assembly 620, partially based on the spool assembly shown in FIG. 11. Openings 633 in spool pipe 631 serve as inlets to the mixing chamber 632. An externally and internally threaded nut 633 locks the assembly of spring disks 238, 239, spacer rings 240, bimetal disk 250 and ring 256. Operation of the assembly is described in detail in relation to FIG. 11.

Figure 23:
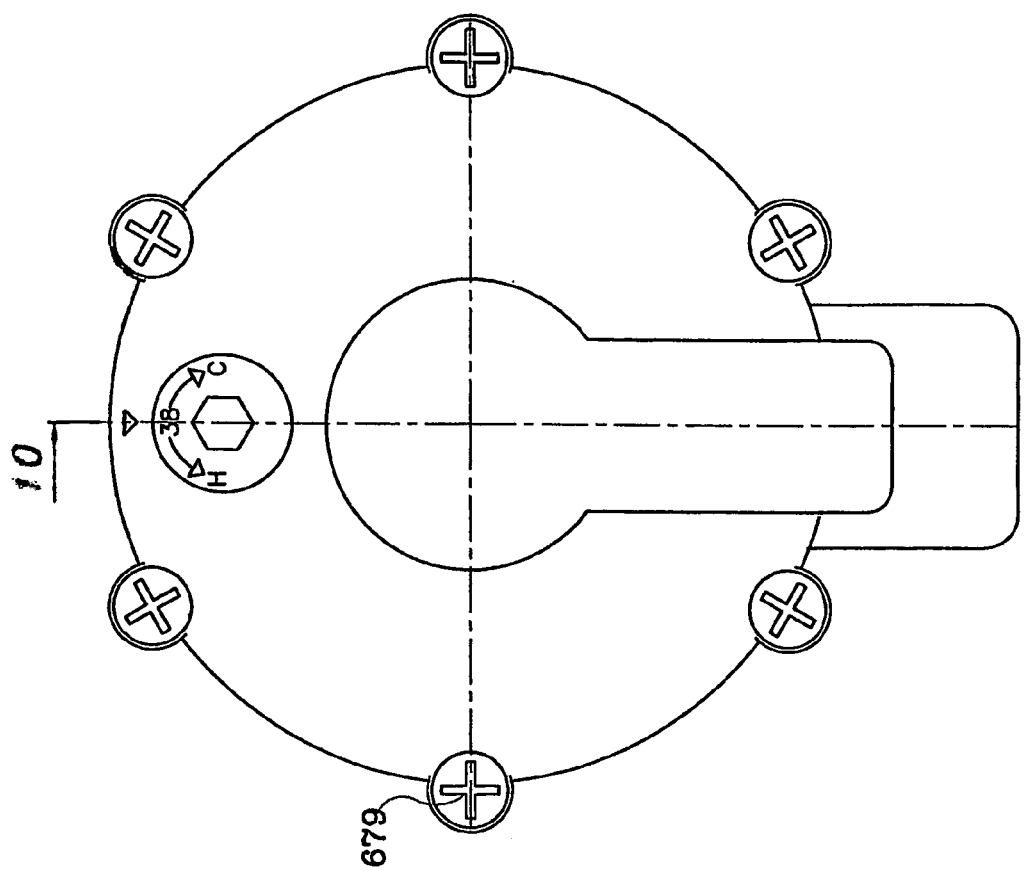
FIG. 23 illustrates an end view of the thermostatic mixing valve of FIG. 22.
Figure 22:
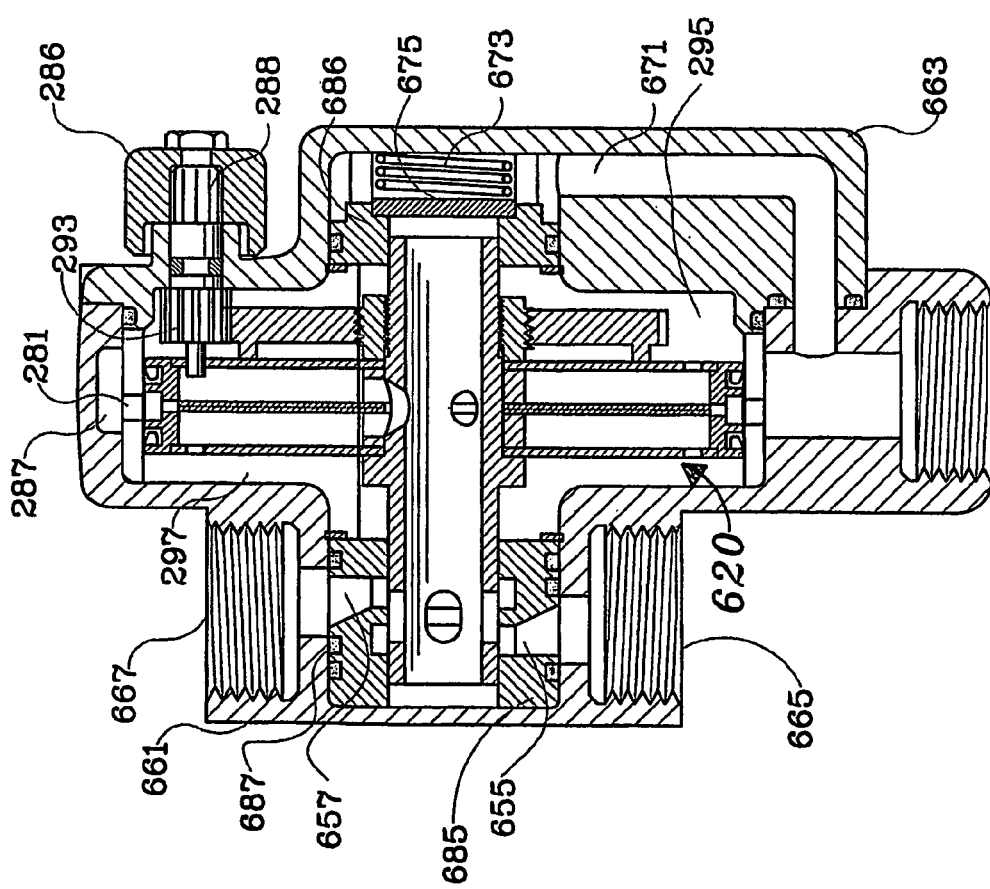
FIG. 22 illustrates a cross-sectional view of a thermostatic mixing valve including the spool assembly of FIG. 21, disposed within a housing.

Referring now to FIGS. 22 and 23 in conjunction with FIG. 21, there is seen a cross-sectional view (FIG. 22) taken along line 10-10 of an end view (FIG. 23) of a mixing valve 660. Spool assembly 620 (as disclosed hereinabove in relation to FIG. 21) is disposed within housing 661 and housing closure 663.

Here a spring-loaded bypass 671 located within closure 663 is configured to allow water flow through the bypass when pressure drop across the valve is higher than a certain preselected pressure.

Hot water inlet 665 and cold water inlet 667 are directed by sleeve 685 with diagonal seal 687 to allow space for inlet 657 of cold water and inlet 655 of hot water through openings 633 in the spool pipe into the mixing chamber 632.

As long as the pressure drop between mixing chamber 632 and the outlet port 669 is lower than a certain preselected value the disk 675 is pushed by spring 673 towards its seat in sleeve 686 and water can flow only through openings 237 of the spool assembly 620 on both sides of the bimetal disk 250 through gaps 246, 247 holes 255, 281 to the exit port 669.

If higher flow rates are desired, the pressure drop between mixing chamber 632 and outlet port 669 will increase such that the bypass disk 675 will force back spring 673 and allow flow of mixed water through bypass 671. This embodiment of the present invention uses the spool assembly at a narrow flow margin to achieve more accurate temperature control, yet when there is demand for high flow rates, increase in flow is directed through the bypass 671, this will not affect the accurate mixing to the pre-selected temperature performed at the end of the spool pipe 631 opposite to the bypass 671. The spool pipe 631 is open on both sides to eliminate influence of inlet water pressure on spool position.

The assembly composed of housing 661 and cover 663 is attached with screws 679 (FIG. 23) to correctly align the bypass 671 in the cover with its opening in the housing. Rotation of the adjusting knob 286 will rotate the gear 259 to set the desired temperature as described in detail in relation to FIG. 14.

Figure 24:
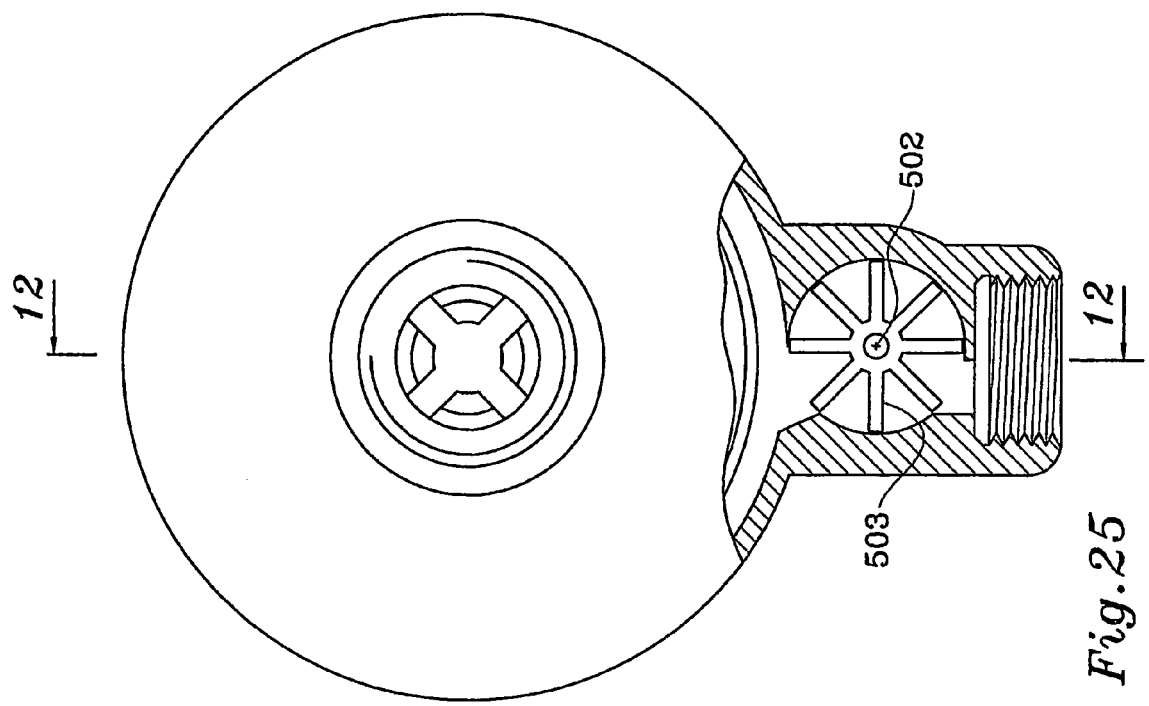
FIG. 24 illustrates a cross-sectional view of a thermostatic mixing valve in according with a further embodiment of the present invention, including the spool assembly of FIG. 10, disposed within a housing.
Figure 25:
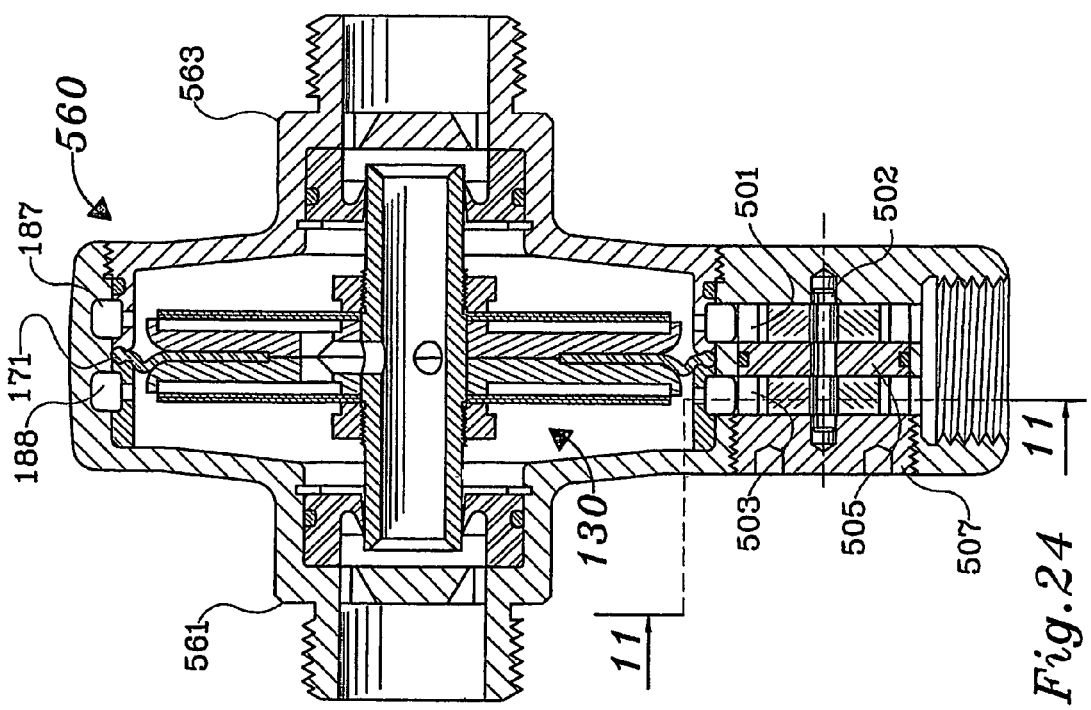
FIG. 25 illustrates a partially sectioned end view of the thermostatic mixing valve of FIG. 24.

Referring now to FIGS. 24-25, in accordance with a further preferred embodiment of the present invention, there is seen a cross-sectional view (FIG. 24) taken along line 12-12 of an end view (FIG. 25) and a partially sectioned end view (FIG. 25) taken along line 11-11 of FIG. 24. Both describe a mixing valve 560, which is disposed within a housing 561 and housing closure 563, spool assembly 130 (as disclosed hereinabove in relation to FIG. 10) and diaphragm 171 (as disclosed herein above in relation to FIG. 12).

The suggested embodiment is based on the mixing valve 160 as described in relation to FIGS. 12, 13.

Here vane wheels 501 and 503, disposed on a common shaft axis 502, and hence rotating at the same speed, force the same volumetric output through both sides of the central diaphragm 171. In FIG. 24, a separator, such as ring 505 in a preferred embodiment of the invention, maintains fluid separation between the two component streams. To facilitate assembly, the bottom portion of housing 561 is closed with a threaded plug 507, which centers and hold the exposed shaft defined by axis 502 of vane wheels 501, 503.

In this embodiment of the present invention, vane wheels 501 and 503 comprise the flow divider replacing the orifices 189 and 190 described in conjunction with FIG. 12, and the fixed equal restrictor type flow divider 11 in the method of FIG. 2. Replacing the fixed restrictor type flow divider 11 with an active vane flow divider greatly increases the margin of flow rate while temperature accuracy is strictly maintained. It should be noted that the volume of fluid filling the chamber defined by the vane wheels 501 and 503 serves, even with the absence of the vane wheel itself, as a regulating chamber, averaging the temperature of the water volume captured inside. A circular flow path such as is defined in FIG. 25 has good temperature averaging capability, even without the vane itself. A greater volume of fluid and therefore better regulation is easily accommodated simply by use of a larger capacity chamber.

It will be appreciated by persons skilled in the art that, while the details disclosed hereinabove relate to water flow, the mixing valves disclosed in accordance with the various embodiments of the present invention are not limited to mixing of water but are usable for the mixing of a wide variety of fluids having different and variable temperatures and pressures to provide a substantially stable preselected mixed fluid temperature.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

The invention claimed is:

1. A fluid mixing valve for producing a mixed fluid stream from first and second fluid streams having different, varying temperatures and pressures, said mixed fluid stream having a substantially stable, preselected temperature of a magnitude between the temperatures of said first and second fluid streams, said fluid mixing valve utilizing substantially the full flow of fluid in the relatively short and wide control channels, said mixing valve comprising:
   a) a housing comprising:
      i) a first fluid inlet for admitting said first fluid stream;
      ii) a second fluid inlet for admitting said second fluid stream; and
      iii) a first fluid outlet for a resulting said mixed fluid stream; and
   b) a mixing regulation assembly displaceably disposed within said housing, comprising:
      i) a mixing element having spaced apart third and fourth fluid inlets, and a second fluid outlet arranged in fluid flow communication with said third and fourth fluid inlets, said third and fourth fluid inlets being arranged so as to permit the flow therethrough of said first and second fluid streams so as to facilitate mixing thereof into said mixed fluid stream, said second fluid outlet being arranged so as to facilitate outflow therethrough of said mixed fluid stream,
      ii) a flow divider, arranged in fluid flow communication with said second fluid outlet, operative to divide said mixed stream into two component streams each having rates of flow and pressures which are substantially equal to those of the other;
      iii) at least one flow controlling mechanism for increasing the flow of one of said two component streams and decreasing the flow of the other of said two component streams in concert, so as to induce a pressure differential between said two component streams;

iv) at least one thermally responsive element arranged to be in fluid flow and in heat transfer communication with at least one of said two component streams and operative, to control said at least one flow controlling mechanism in response to a difference between the temperature of said two component streams and said preselected temperature; and v) a recombination and discharge means for recombining said two component steams into said mixed fluid stream for output from said fluid mixing valve via said first fluid outlet;

wherein, in response to a difference between the temperature of said two component streams and said preselected temperature resulting from a change in temperature or pressure of at least one of said first and second fluid streams, said mixing regulation assembly is operative in response to the induced pressure differential between said two component fluid streams, to adjust the relative flows of said first and second fluid streams so as to counterbalance the difference between the temperatures of said two component streams and said preselected temperature, thereby substantially restoring said mixed fluid stream to said preselected temperature.

2. The fluid mixing valve in accordance with claim 1, wherein said first and second fluid inlets respectively include first and second inlet valves which are mechanically linked so as to control the relative inlet flows of said first and second fluid streams.

3. The fluid mixing valve in accordance with claim 2, wherein said first and second inlet valves substantially increase the flow through one of said first and second fluid inlets while simultaneously decreasing the flow through the other of said first and second fluid inlets in response to said mixing element.

4. The fluid mixing valve in accordance with claim 1, wherein said first fluid outlet includes an outlet flow regulator valve for controlling the rate of flow through said fluid mixing valve.

5. The fluid mixing valve in accordance with claim 1, wherein said housing includes at least one housing element and at least one closure element for facilitating disposition of said mixing regulation assembly therein.

6. The fluid mixing valve in accordance with claim 1, wherein said housing includes a temperature adjusting mechanism for altering said preselected temperature of said mixed fluid stream, said temperature adjusting mechanism including at least one pressure differential inducing mechanism for changing the relative rates of flow of said two component fluid streams therebetween, wherein said at least one pressure differential inducing mechanism is selected from the group of: a double-acting valve; a displacement mechanism; and a position-changing mechanism for changing the position of said thermally responsive element.

7. The fluid mixing valve in accordance with claim 6, wherein said temperature adjusting mechanism is configured to provide an equilibrium configuration of said mixing regulation assembly associated with an altered said preselected temperature.

8. The fluid mixing valve in accordance with claim 1, wherein said mixing regulation assembly is configured within said housing as a working element operative in response to said pressure differential between said two component fluid streams and provided with a separator to substantially prevent fluid leakage between said two component streams past said working element, said separator selected from one of the group of: a diaphragm having at least one flexible membrane; a piston having at least one circumferential fluid seal; and a vane rotationally operative having a peripheral seal.

9. The fluid mixing valve in accordance with claim 1, wherein said mixing regulation assembly operative to adjust the relative flows of said first and second fluid streams is selected from the group of: a rotationally operative planar disc; a rotationally operative ball; a displaceably operative planar slide; and a displaceably operative spool pipe assembly.

10. The fluid mixing valve in accordance with claim 1, wherein said mixing regulation assembly further comprises at least one space-saving ring located in the internal volume of the spool on at least one side of a bimetal disk.

11. The fluid mixing valve in accordance with claim 1, wherein said flow divider is selected as one of either fixed orifices and vane wheels disposed on a common axis.

12. The fluid mixing valve in accordance with claim 1, wherein a relative portion of said mixed fluid is discharged through a spring-loaded bypass before entering said flow divider thereby allowing high fluid flow rates of mixed fluid through said mixing valve.

13. The fluid mixing valve in accordance with claim 1, wherein said at least one thermally responsive element is selected from one of the groups of bimetal elements; thermally expandable elements; wax-operated thermostats; and fluid-operable elements.

14. The fluid mixing valve in accordance with claim 13 wherein said bimetal elements are configured as one of the elements selected from the group: disc, coil and rod.

15. The fluid mixing valve in accordance with claim 1, wherein said at least one flow controlling mechanism includes a double-acting valve device for altering said preselected temperature of said mixed fluid stream.

16. The fluid mixing valve in accordance with claim 1, wherein said recombination and discharge means is disposed in said housing external to said mixing regulation assembly.

17. The fluid mixing valve in accordance with claim 1, wherein said recombination and discharge means includes a double-acting valve for changing the relative rates of flow of said two component fluid streams so as to induce a pressure differential therebetween, thereby altering said preselected temperature.

18. A method for producing a mixed fluid stream from first and second inlet fluid streams having different, varying temperatures, and having different, varying pressures, said mixed fluid stream having a substantially stable, preselected temperature of a magnitude between the temperature of said first and second inlet fluid streams, said method including the steps of:

a) combining said first and second inlet fluid streams so as to produce said mixed fluid stream;

b) dividing said mixed fluid stream into two component streams having respective rates of flow and pressures which are substantially equal;

c) sensing a difference between the temperature of said two component streams and said preselected temperature;

d) unbalancing the substantially equal rates of flow of said two component streams, such that the rate of flow of one of said two component streams is increased and the rate of flow of the other of said two component streams is decreased in accordance with the sensed difference between the temperature of said two component streams and said preselected temperature, thereby inducing a pressure differential between said two component streams;

e) adjusting the relative rates of flow of said first and second inlet fluid streams in relation to said induced pressure differential between said two component streams, such that the flow of one of said first and second inlet fluid streams is increased and the flow of the other of said first and second inlet fluid streams is decreased in relation to said induced pressure differential between said two component streams, thereby restoring the temperature of said two component streams substantially to said preselected fluid temperature; and f) recombining said two component streams to produce a combined outlet stream.

19. The method in accordance with claim 18, wherein said step b) of dividing said mixed fluid stream into two component streams utilizes a volumetric flow divider.

20. The method in accordance with claim 18, wherein after the step a) of combining said first and second inlet fluid streams so as to produce said mixed fluid stream there is a step of direct discharge of a relative portion of said mixed fluid stream to an outlet stream.

21. The method in accordance with claim 18, wherein said step d) of unbalancing the substantially equal rates of flow of said two component streams includes inducing said pressure differential between said two component streams thereby altering said preselected temperature of said mixed fluid stream.

22. The method in accordance with claim 18, wherein said step e) of adjusting the relative rates of flow of said first and second inlet fluid streams includes substantially terminating the flow of one of said first and second inlet fluid streams if the flow of the other of said first and second inlet fluid streams is substantially terminated.

23. The method in accordance with claim 18, wherein said step of recombining said two component streams includes adjusting the relative rates of flow of said two component streams so as to induce said pressure differential between said two component streams thereby altering said preselected temperature of said mixed fluid stream.

24. The method in accordance with claim 18, further comprising reversing step b) dividing said mixed fluid stream into two component streams and step d) unbalancing the substantially equal rates of flow of said two component streams.

* * * * *